(12) United States Patent
Maupin et al.

(10) Patent No.: US 8,191,466 B2
(45) Date of Patent: Jun. 5, 2012

(54) ROTARY SCREW BLANCHER WITH FLUID PASSAGE AND FLUID AGITATION

(75) Inventors: Daniel D. Maupin, Corvallis, OR (US); David R. Zittel, Columbus, WI (US)

(73) Assignee: Lyco Manufacturing, Inc., Columbus, WI (US)

( * ) Notice: Subject to any disclaimer, the term of this patent is extended or adjusted under 35 U.S.C. 154(b) by 0 days.

(21) Appl. No.: 12/569,970

(22) Filed: Sep. 30, 2009

(65) Prior Publication Data

US 2011/0072980 A1 Mar. 31, 2011

(51) Int. Cl.
A47J 37/12 (2006.01)
(52) U.S. Cl. .............. 99/348; 99/406; 99/404; 99/443 C
(58) Field of Classification Search .................... 99/348, 99/404, 405, 406, 443 C, 443 R; 366/318, 366/324, 144, 90, 79
See application file for complete search history.

(56) References Cited

U.S. PATENT DOCUMENTS

| | | | |
|---|---|---|---|
| 2,299,080 A | 10/1942 | DeBack | |
| 2,314,871 A | 3/1943 | DeBack | |
| 3,086,444 A * | 4/1963 | De Back | 99/483 |
| 3,616,747 A * | 11/1971 | Lapeyre | 99/405 |
| 3,722,401 A * | 3/1973 | Davidson et al. | 99/407 |
| 3,760,714 A * | 9/1973 | Lortz | 99/404 |
| 4,181,072 A * | 1/1980 | Hirahara | 99/353 |
| 4,238,997 A * | 12/1980 | Hengstenberg | 99/483 |
| 4,250,802 A * | 2/1981 | Rubio | 99/348 |
| 4,567,941 A | 2/1986 | Coppolani | |
| 4,688,476 A | 8/1987 | Zittel | |
| 4,934,259 A * | 6/1990 | Watanabe | 99/339 |
| 5,133,249 A | 7/1992 | Zittel | |
| 5,146,841 A | 9/1992 | Zittel | |
| 5,327,817 A | 7/1994 | Zittel | |
| 5,329,842 A | 7/1994 | Zittel | |

(Continued)

FOREIGN PATENT DOCUMENTS

BE 896864 9/1993

(Continued)

OTHER PUBLICATIONS

Idaho Steel, Product Detail—Blancher or Preheater, available online at: <http://www.idahosteel.com/Blancher.htm>, at least as early as Aug. 2008.

(Continued)

*Primary Examiner* — Reginald L Alexander
(74) *Attorney, Agent, or Firm* — George R. Corrigan

(57) ABSTRACT

A food processing apparatus including a tank having an inlet end for receiving food product and an outlet end for discharging food product, the tank having an inner wall defining a compartment and including a solid, imperforate wall portion, fluid being contained in the compartment, and a rotatable auger mounted in the compartment, the auger for advancing food product within the compartment from the inlet end toward the outlet end, the auger including flights having a flight wall with a radial edge, a clearance space being defined between the radial edge of the flights and the solid, imperforate wall portion of the inner wall. Flow of fluid through the clearance space may be inhibited. One of the inner wall and the flight wall may include a perforated wall portion. Flow of fluid between the first auger section and the second auger section may be provided through the perforated wall portion.

27 Claims, 15 Drawing Sheets

U.S. PATENT DOCUMENTS

| | | |
|---|---|---|
| 5,341,729 A | 8/1994 | Zittel |
| 5,427,015 A | 6/1995 | Zittel |
| 5,429,041 A | 7/1995 | Zittel |
| 5,592,869 A | 1/1997 | Zittel |
| 5,632,195 A | 5/1997 | Zittel |
| 5,669,288 A | 9/1997 | Zittel |
| 5,752,431 A | 5/1998 | Zittel |
| 5,802,961 A | 9/1998 | Hay et al. |
| 5,972,413 A | 10/1999 | Whitney et al. |
| 6,095,035 A | 8/2000 | Zittel et al. |
| 6,187,360 B1 | 2/2001 | Zittel |
| 6,205,913 B1 | 3/2001 | Zittel et al. |
| 6,214,400 B1 | 4/2001 | Zittel et al. |
| 6,234,066 B1 | 5/2001 | Zittel et al. |
| 6,263,785 B1 | 7/2001 | Zittel |
| 6,615,707 B1 | 9/2003 | Zittel et al. |
| 6,817,284 B2 | 11/2004 | Zittel |
| 7,500,426 B2 | 3/2009 | Zittel et al. |
| 2006/0283333 A1 | 12/2006 | Zittel et al. |
| 2007/0044666 A1 | 3/2007 | Zittel |
| 2010/0014925 A1 | 1/2010 | Stousland |
| 2010/0015311 A1 | 1/2010 | Stousland |

FOREIGN PATENT DOCUMENTS

| | | |
|---|---|---|
| EP | 1203537 | 5/2002 |
| EP | 10251582 | 4/2011 |

OTHER PUBLICATIONS

G. J. Olney, Inc., Destoning Washer with E-Z Clean Stone Crib for Peas and Lima Beans, Brochure, Bulletin 96SB29, available at least as early as Aug. 2008.

Venturi Jet Pumps Ltd., Hooper Eductors, Hooper Eductors for pumping and conveying granular solids and powders, available online at: <http://www.venturipumps.com/hoppereductor.htm>, available at least as early as Aug. 2008.

Stratton, Harry, "Liquid Jet Eductors—The "Pumps" with No Moving Parts", Plant Engineering, Apr. 29, 1976.

Schutte & Koerting, Solids Handling Eductors Eductors Using Liquid in Handling Dry Solids, available online at: <http://www.s-k.com/pages/pro_02_02.html>, available at least as early as May 2009.

Northeast Controls Inc., Intermittent Operation Arrangement, available online at: <http://www.nciweb.net/newpage61.htm>, available at least as early as May 2009.

Schutte & Koerting, Eductors & Syphons—Annular Multi-Nozzle Eductor, available online at: <http://www.s-k.com/pages/pro_01_07.html>, available at least as early as May 2009.

Derbyshire Machine & Tool Co., Peri-Jets & Eductors, available online at: <http://www.derbyshiremachine.com/perijet.html>, available at least as early as Jun. 2008.

EXAIR, How the Exair Line Vac Works, Air Operated Conveyors, available online at: <http://www.exair.com/en-US/Primary%20Navigation/Products/Air%20Operated%20Conveyors/Pages/How%20Line%20Vac%20Works.aspx>, available at least as early as May 2009.

European Search Report, Application No. 05 25 8075, Applicant, Lyco Manufacturing, Inc., dated Mar. 14, 2007.

European Search Report for European Application No. 0523925.1-2313 mailed Jul. 31, 2006.

Declaration of David R. Zittel dated Nov. 23, 2005.

* cited by examiner

ROTARY SCREW BLANCHER WITH FLUID PASSAGE AND FLUID AGITATION

FIELD OF THE INVENTION

The present invention relates to blanchers and, more particularly to rotary screw blanchers with a passage for fluid and/or with fluid agitation.

SUMMARY

In mass processing of food product, food product is often heated by cooking or blanching the food product in a food processing apparatus having a tank holding a heat transfer medium into which the food product is immersed. After cooking or blanching of the food product occurs, the food product may be cooled or chilled by immersing the food product in a cool transfer medium so that the food product may be packaged, stored and/or shipped. In some known systems, a rotary drum blancher or a rotary screw blancher is used to first cook or blanch the food product, and the food product is discharged onto a belt or other type of conveyor and advanced to a rotary cooler to reduce the food product temperature to an acceptable temperature. In another known system, a single compact apparatus (e.g., a combination cooker-cooler) is used to heat and cool the food product in continuous flow.

In a rotary drum blancher, food product is introduced into an inlet end of an elongate drum, which is rotatably mounted in a generally cylindrical, open-top tank. The tank is fitted with a cover for minimizing heat loss and for enclosing the drum for safety reasons, and which can be opened for maintenance and cleaning. The drum includes an auger therein for advancing food product from the inlet end of the drum to an outlet end of the drum and through the heat transfer medium. The drum includes a structural frame with perforated skin panels, some of which may be pivotally attached to the frame to serve as access doors.

In a rotary screw blancher, food product is introduced into an inlet end of a generally cylindrical, open-top tank. A rotatable auger is mounted within the tank for advancing food product from the inlet end to an outlet end of the tank and through a heat transfer medium. The tank is fitted with a cover for minimizing heat loss and for enclosing the auger for safety reasons, and which can be opened for maintenance and cleaning.

The rotary blancher is generally used to cook a variety of food products, including pasta, rice, vegetables, dry beans, pouched meat, pouched sauces, etc. Cleanliness is a concern in the food processing industry, and strict hygienic standards and inspections are observed throughout the industry for machinery that comes in contact with food for human consumption. Many facilities will process small batches of a variety of products in a single day or shift, which requires cleaning of the rotary blancher, and in particular the drum, between product runs. It is necessary for rotary blanchers to provide access for cleaning sprays to all joints and cavities within the drum where contaminant accumulation may occur. In current rotary drum blanchers, it is necessary to remove perforated skin panels from the drum frame or reposition access doors of the drum to perform the necessary cleaning. Such actions require high levels of labor and machine down time.

One solution is use of a rotary screw blancher, which is easier to clean because the rotary screw blancher lacks a drum and has higher food product capacity than similarly sized rotary drum blanchers because food product can run at deeper depths. However, the auger causes more damage to food product as compared to rotary drum blanchers, especially if food product is caught in clearance gaps between the auger and the tank. Also, the increased processing depth causes more friction between the food product and the auger flights, as well as the tank wall, and the increased depth causes increased temperature gradients in the process water.

In one independent embodiment of the invention and in some constructions, a food processing apparatus may generally include a tank having an inlet end for receiving food product and an outlet end for discharging food product, the tank having an inner wall defining a compartment and including a solid, imperforate wall portion, fluid being contained in the compartment, and a rotatable auger mounted in the compartment, the auger for advancing food product within the compartment from the inlet end toward the outlet end, the auger including flights having a flight wall with a radial edge, the flight wall separating a first auger section from a second auger section, a clearance space being defined between the radial edge of the flights and the solid, imperforate wall portion of the inner wall. Flow of fluid through the clearance space between the first auger section and the second auger section may be inhibited. One of the inner wall and the flight wall may include a perforated wall portion. Flow of fluid between the first auger section and the second auger section may be provided through the perforated wall portion.

In some constructions, the inner wall of the tank may include the perforated wall portion, and the tank may have a tank wall providing the solid, imperforate wall portion and an outwardly-extending second wall portion. In such constructions, a passage may be defined between the perforated wall portion and the second wall portion, the passage extending in a direction of the inlet end and the outlet end, the passage extending at least between the first auger section and the second auger section. Flow of fluid between the first auger section and the second auger section may be provided through the perforated wall portion and into and along the passage.

In another embodiment, a food processing apparatus may generally include a tank having an inlet end for receiving food product and an outlet end for discharging food product, the tank having an inner wall defining a compartment, a fluid being contained in the compartment, the inner wall having opposite sides generally parallel to a direction from the inlet end to the outlet end, a rotatable auger mounted in the compartment for rotation about an axis, the auger for advancing food product within the compartment from the inlet end toward the outlet end, the auger including flights having a radial edge, and a manifold supported in the compartment above the axis of the auger, the manifold being positioned closer to one opposite side of the inner wall, the manifold being configured to inject fluid downwardly into the compartment.

In yet another independent embodiment, a food processing apparatus may generally include a tank having an inlet end for receiving food product and an outlet end for discharging food product, the tank having an inner wall defining a compartment, a fluid being contained in the compartment, the inner wall including a solid, imperforate wall portion and a perforated wall portion, the tank having a tank wall providing the solid, imperforate wall portion and a second wall portion, a passage being defined between the perforated wall portion and the second wall portion, the passage extending in a direction of and at least a portion of a distance between the inlet end and the outlet end, a rotatable auger mounted in the compartment, the auger for advancing food product within the compartment from the inlet end toward the outlet end, the auger including flights having a radial edge, a clearance space being defined between the radial edge of the flights and the inner wall, and a manifold supported in the compartment above the axis of the auger, the manifold being positioned closer to one opposite side of the inner wall, the manifold being configured to inject fluid downwardly along one opposite side of the inner wall. Flow of fluid through the clearance space between the radial edge of the flights and the solid, imperforate wall portion may be inhibited along at least a portion of the distance between the inlet end and the outlet end, and flow of fluid may be provided through the passage along at least a portion of the distance between the inlet end and the outlet end.

Other independent aspects of the invention will become apparent by consideration of the detailed description, claims and accompanying drawings.

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
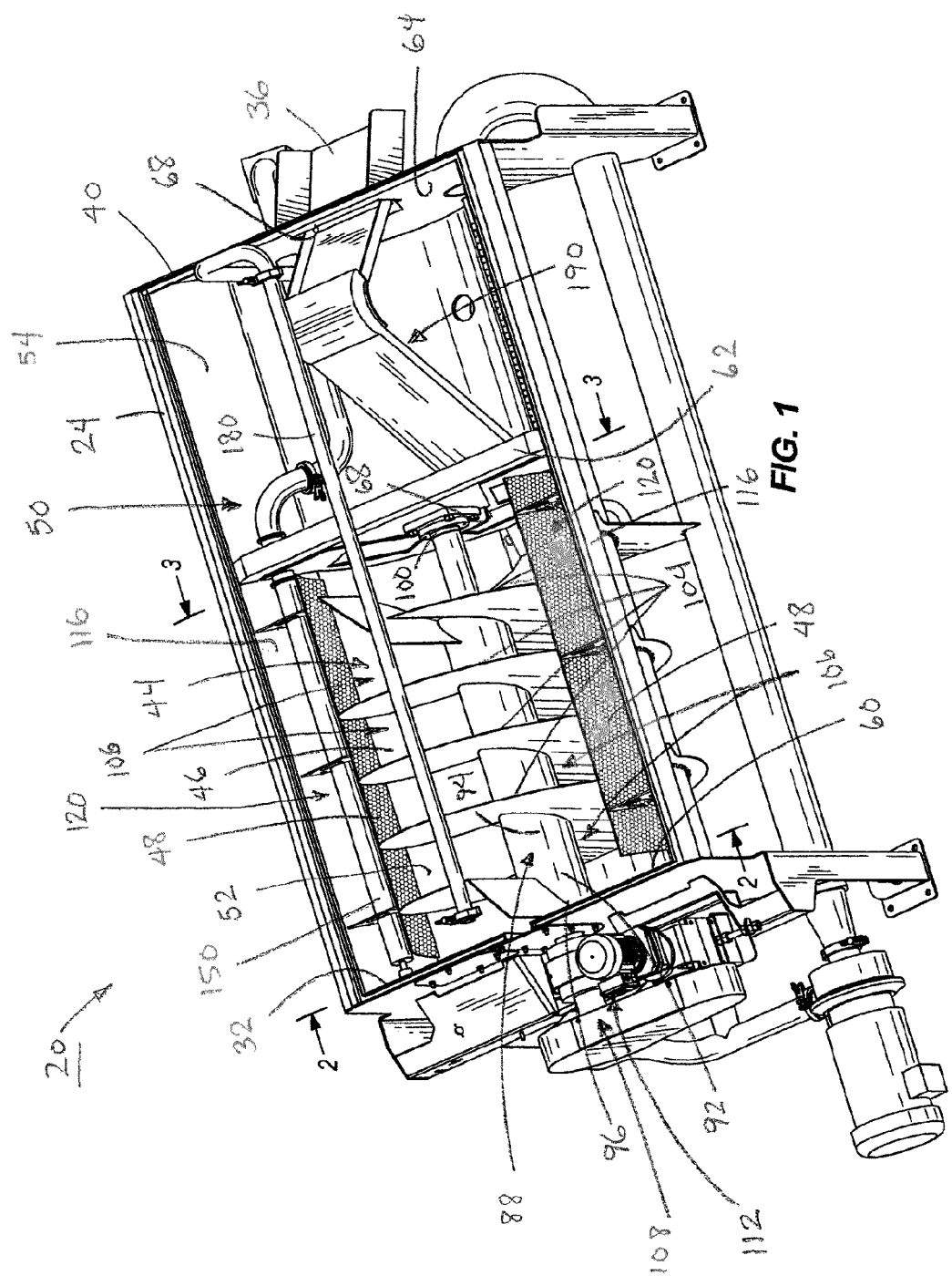
FIG. 1 is a perspective view of a rotary screw blancher.
Figure 2:
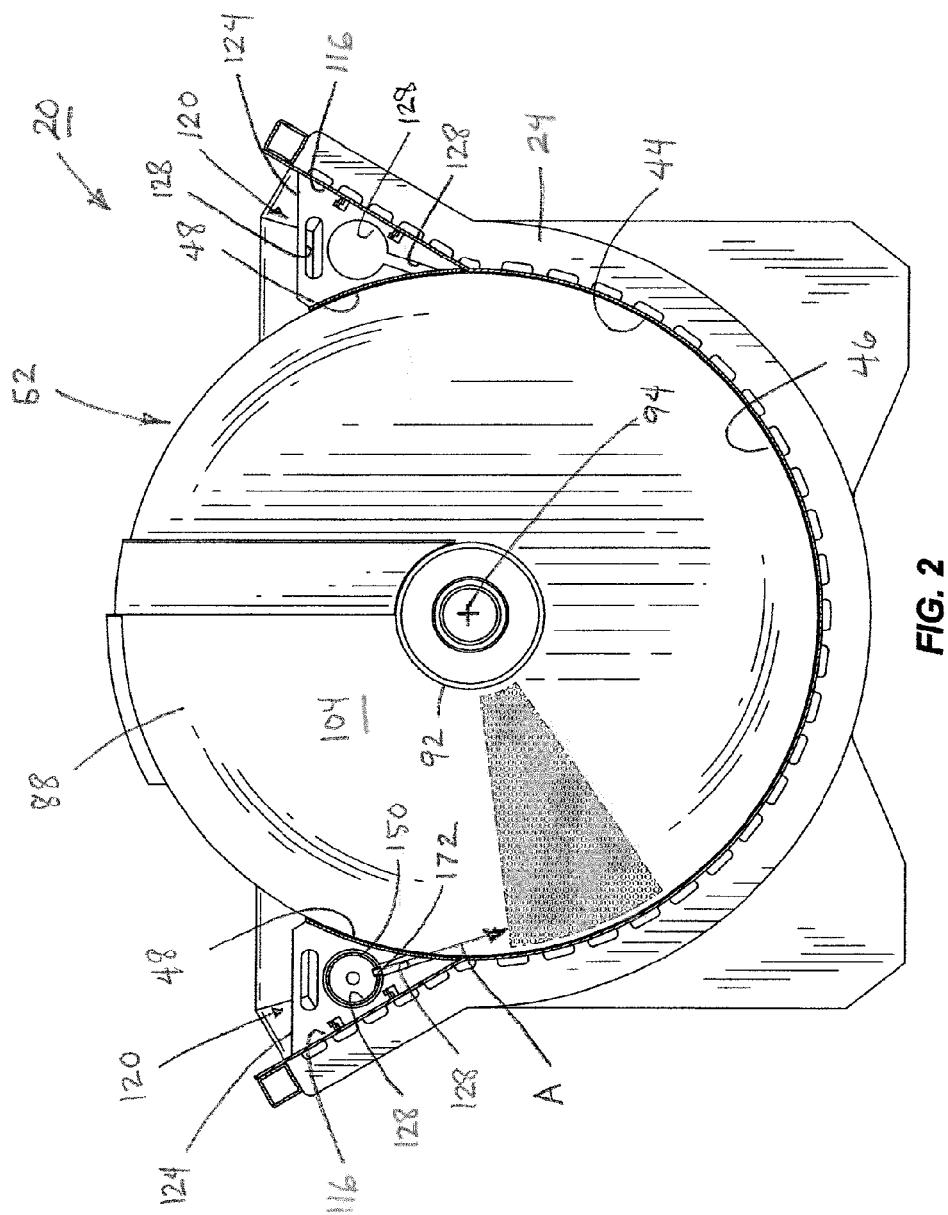
FIG. 2 is a partial cross-sectional end view of the blancher taken generally along line 2-2 in FIG. 1.
Figure 3:
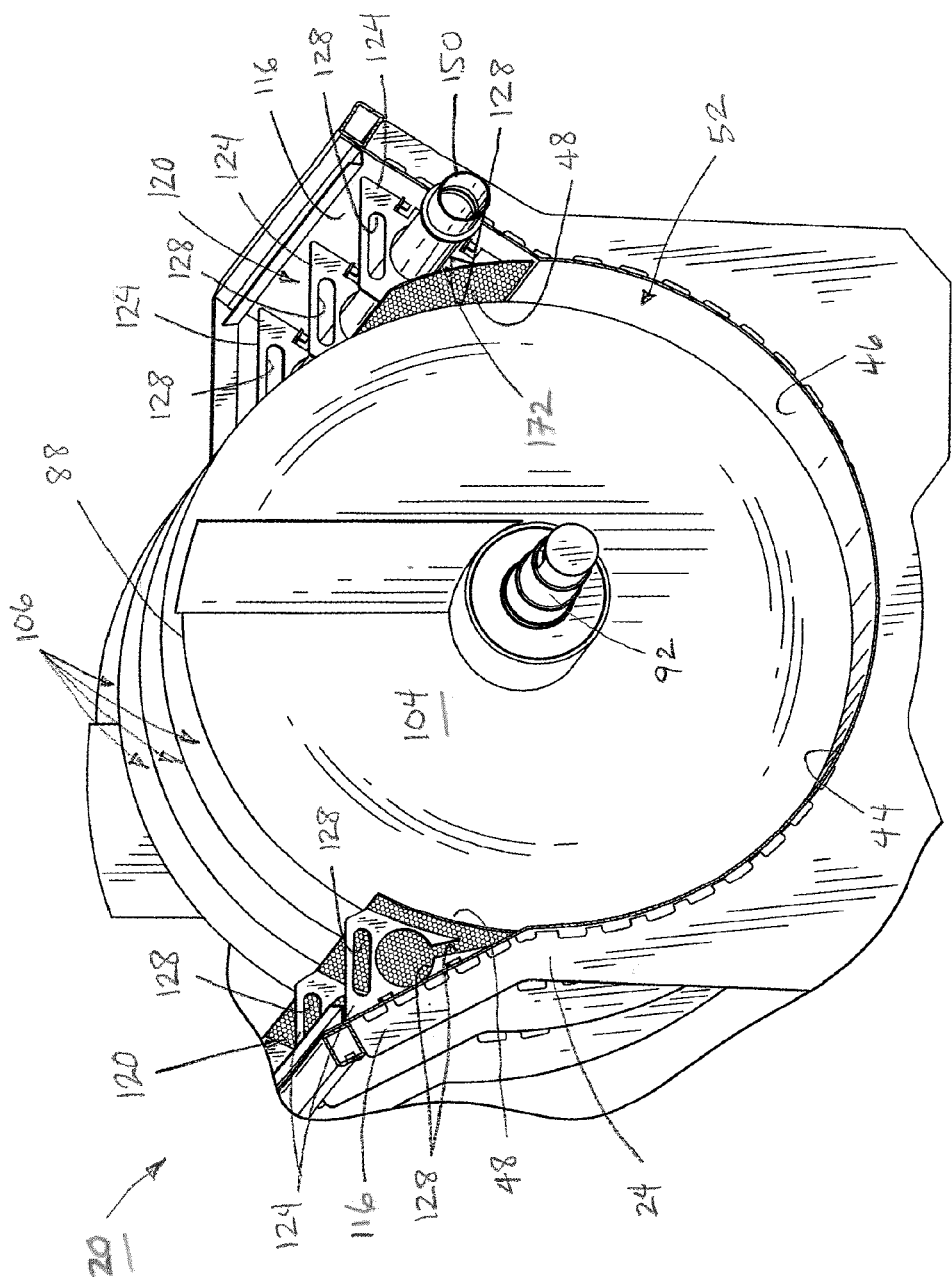
FIG. 3 is a partial cross-sectional perspective view of the blancher taken generally along line 3-3 in FIG. 1.

FIGS. 1-3 show a rotary screw blancher 20 for use in a food processing system. The blancher 20, or cooker, uses a heat transfer medium to cook food product that advances through the blancher 20. In other constructions, the blancher 20 may be used for other food processing operations, such as, for example, cooling food product. Features of the blancher 20 may be similar to the blancher shown and described in U.S. patent application Ser. No. 11/216,478, filed Aug. 31, 2005, the entire contents of which are hereby incorporated by reference.

The rotary blancher 20 includes a tank 24. Food product is deposited into the tank 24 at an infeed flume (not shown but similar to the infeed flume shown and described in U.S. patent application Ser. No. 11/216,478) at an inlet end 32 and discharged from the blancher 20 at a discharge chute 36 (FIG. 1) at an outlet end 40. In the illustrated construction, the tank 24 is an open-top tank including an inner wall 44. In some constructions, the inner wall 44 has a solid, imperforate wall portion 46 and a perforated wall portion 48.

The tank 24 is supported by a frame having legs that rest upon a support surface and space the tank 24 above the support surface. The tank 24 is preferably made of stainless steel or another suitable material for food processing applications. The tank 24 defines, in part, an inner compartment 50 which, in the illustrated construction, is divided into a blanching compartment 52 and a dewatering compartment 54. In other constructions, the inner compartment 50 may include a single compartment or may be divided into more than two compartments.

The tank 24 includes an inlet end wall 60 at the inlet end 32 of the tank 24, an intermediate wall 62 and an outlet end wall 64 at the outlet end 40 of the tank 24. Each end wall 60, 64 defines an opening 68 (the opening in the outlet end wall 64 is shown in FIG. 1) that communicates with the inner compartment 50 of the tank 24. As shown in FIG. 1, the infeed flume passes through the opening 68 in the inlet end wall 60 and the discharge chute 36 passes through the opening 68 in the outlet end wall 64.

The intermediate wall 62 divides the inner compartment 50 into the blanching compartment 52 and the dewatering compartment 54. The intermediate wall 62 also defines an opening 68 communicating between the blanching compartment 52 and the dewatering compartment 54. Other configurations of the walls, openings and chutes may be utilized in other constructions of the blancher 20.

An elongated vaulted cover (not shown) mates with the tank 24 and covers the tank 24 to substantially enclose the inner compartment 50 and provide an enclosure for the heat transfer medium. The cover includes an inlet end wall (not shown) for positioning at the inlet end 32 of the blancher 20 and an outlet end wall (not shown) for positioning at the outlet end 40 of the blancher 20. Each cover end wall is configured to complement the tank end walls 60, 64 and the infeed flume and discharge chute 36.

The cover is generally attached to the tank 24 in such a manner as to allow the cover to move relative to the tank 24 and permit access to the inner compartment 50. In the one construction, lift cylinders (not shown) may extend between the tank 24 and the cover to lift the cover relative to the tank 24 and permit access to the tank 24 and the inner compartment 50. In another construction, the cover may be hindgedly connected to the tank 24 so the cover can be swung away from the tank 24 to permit access to the tank 24 and the inner compartment 50.

An auger 88, or helical screw, is disposed within the blanching compartment 52 and rotates to advance food product from the inlet end 32 of the tank 24 toward the outlet end 40 of the tank 24. The auger 88 includes a shaft 92 that extends along an axis 94 between the inlet end wall 60 and the intermediate wall 62 of the tank 24. To support the auger 88, a first end 96 of the shaft 92 is rotatably supported by the inlet end wall 60, and a second end 100 of the shaft 92 is rotatably supported by the intermediate wall 62.

The auger 88 includes a plurality of axially spaced apart and interconnected flights 104 that spiral substantially the length of the blanching compartment 52. Generally, the flights 104 define auger sections 106 therebetween. As the auger 88 rotates, the flights 104 move food product from the inlet end 32 of the tank 24 to the intermediate wall 62 of the tank 24 and through the sections 106 of the auger 88.

The blancher 20 includes a drive assembly 108 interconnected with the auger shaft 92 and a main drive motor 112, which drives rotation of the auger 88. In the illustrated construction, the infeed flume is offset from a centerline of the tank 24 to accommodate the drive assembly 108. However, in other constructions, the infeed flume and the drive assembly 108 may be reconfigured to allow the infeed flume to be positioned along the center line of the tank 24.

In the illustrated construction (see FIG. 2), the tank 24 and the auger 88 are configured and adapted to maintain a tight tolerance between the two. For example, a clearance gap between the inner wall 44 and the radial edge of the auger flights 104 may be between about 0.03 inches and about 0.25 inches and, in some constructions, between about 0.05 inches and 0.15 inches. In the illustrated construction, the clearance gap is about 0.12 inches. In contrast, a typical rotary screw blancher has a clearance gap of at least 0.25 inches and up to 0.375 inches.

The tight tolerance between the tank 24 and the auger 88 reduces damage to food product passing through the blanching compartment 52, because the small clearance gap prevents even small size food product, such as rice, beans, noodles, etc., from becoming stuck between the inner wall 44 and the auger 88. Generally, as long as the food product to be processed is larger than the clearance gap, damage to the food product passing through the blanching compartment 52 will be reduced. Further, the clearance gap is sufficient to prevent metal-to-metal contact between the tank 24 and the auger 88, as the auger 88 rotates, which could introduce contaminant metal particles into the food product.

Because of the tight tolerance and small clearance gap between the solid, imperforate wall portion 46 of the inner wall 44 and the radial edge of the auger flights 104, flow of fluid is inhibited between the auger sections 106. This may result in an imbalance of fluid in the auger sections 106 as fluid is added in to one auger section (e.g., through the infeed flume at the inlet end 32 and/or through a manifold 150, as described below) and/or as fluid is removed from one auger section (e.g., through the action of the transfer mechanism 190, as described below). In order provide flow of fluid between the auger sections 106, in some aspects, the blancher 20 includes structure to allow passage of fluid between auger sections 106 while preventing movement of food product between the auger sections 106.

As mentioned above, in the illustrated construction, the inner wall 44 has a solid, imperforate wall portion 46 and a perforated wall portion 48. The tank 24 also has an outwardly-extending second wall portion 116 generally connected to the solid, imperforate wall portion 46. The perforated wall portion 48 is positioned such that a passage 120 is defined between the perforated wall portion 48 and the second wall portion 116. The passage 120 extends in a direction of the inlet end 32 and the outlet end 40 and spans at least two auger sections 106. In the illustrated construction, the passage 120 extends from the inlet end 32 to the outlet end 40. In the illustrated construction, the tank 24 includes a passage 120 (and a second wall portion 116 and a perforated wall portion 48) on each lateral side.

Figure 4:
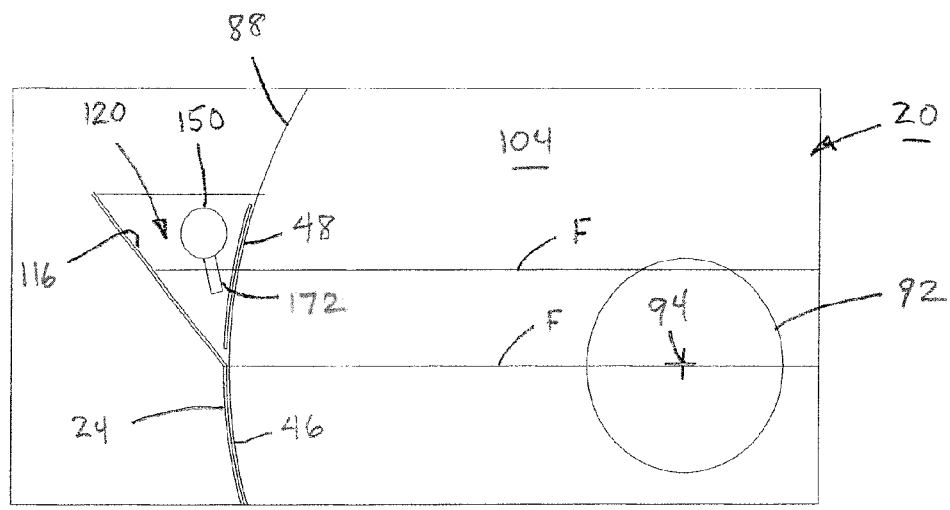
FIG. 4 is a schematic view of a portion of the blancher.
Figure 5:
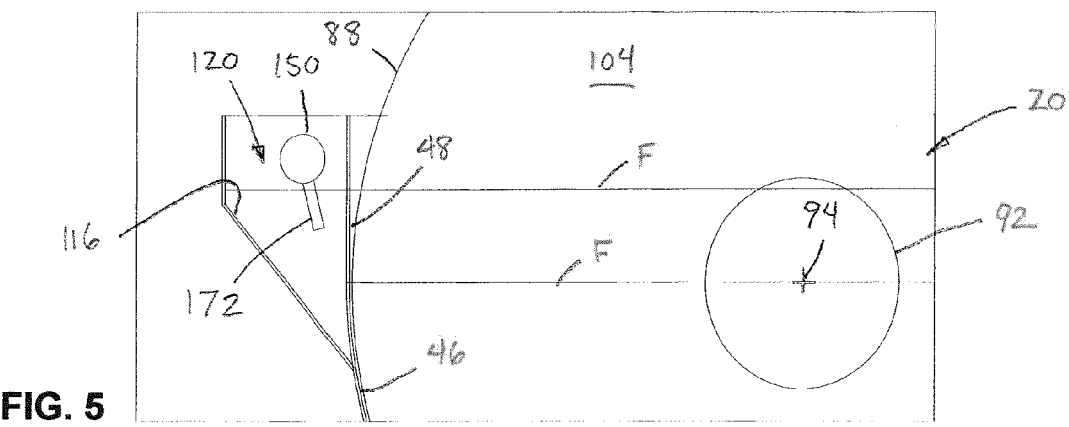
FIG. 5 is a schematic view of a portion of an alternative construction of the blancher.

The level F of fluid (see FIGS. 4-6) in the blanching compartment 52 is generally maintained at about the height of the axis 94 of the auger shaft 92. The fluid level F is maintained below the upper extent of the auger shaft 92 (see FIGS. 4-5) to prevent food product from migrating between the auger sections 106. Generally, at least a portion of the perforated wall portion 48 and the passage 120 is below the fluid level F. Flow of fluid is thus provided through the perforated wall portion 48 and into and along the passage 120 to generally balance the fluid level F in the blanching compartment 52 and between the auger sections 106. At the same time, the shield-like perforated wall portion 48 helps contain the food product in a given auger section 106 and prevent migration of the food product between auger sections 106.

In other constructions, the perforated wall portion 48 and the passage 120 may be arranged in a different manner. For example, in the construction shown in FIG. 5, a majority of the perforated wall portion 48, the second wall portion 116 and the passage 120 is positioned below the upper extent of the auger shaft 92. In such a construction, the fluid level F may be relatively lower (e.g., at or below the height of the axis 94 of the auger shaft 92).

In the construction shown in FIG. 6, the perforated wall portion 48, the second wall portion 116 and the passage 120 are positioned below the axis 94 of the auger shaft 92. In still other constructions (not shown), the perforated wall portion 48, the second wall portion 116 and the passage 120 may be located at a different position in the tank 24 (e.g., in the bottom of the tank 24). In such constructions, the fluid level may be lowered (e.g., at or even further below the height of the axis 94 of the shaft 92).

In the illustrated construction, the perforated wall portion 48 is separate from and connected to the solid, imperforate wall portion 46 with a small clearance gap between the auger flights 104 (e.g., the same clearance gap as between the solid, imperforate wall portion 46 and the auger flight 104). The perforated wall portion 48 may be removable from the tank 24 to, for example, facilitate cleaning, maintenance of the auger 88, etc. In constructions in which the perforated wall portion 48 extends above the axis 94 of the auger 88, the perforated wall portion 48 is installed with the auger 88 in place in the tank 24. In some constructions, the perforated wall portion 48 may be non-removable.

Support members 124 (see FIGS. 2-3) are connected between the second wall portion 116 and the perforated wall portion 48 to support the perforated wall portion 48 in position and to maintain the clearance gap with the auger flights 104. Each support member 124 defines openings 128 to allow fluid to move through the passage 120.

In other constructions, instead of the inner wall 44 of the tank 24 including the perforated wall portion 48, the auger flights 104 may include an auger perforated wall portion 132 (shown in phantom in FIG. 2). In such constructions, the auger perforated wall portion 132 allows passage of fluid between auger sections 106 while preventing movement of food product between the auger sections 106. In other constructions (not shown), the perforated wall portion 132 may be arranged in a different manner and/or more than one perforated wall portion 132 may be provided in each auger flight 104. In still other constructions (not shown), each auger flight 104 may be completely formed as a perforated wall.

Heat transfer medium is supplied to the inner compartment 50 of the tank 24 from a supply source (not shown) by an inlet (not shown) disposed in the inner compartment 50 and is drained from the inner compartment 50 through an outlet (not shown). In one construction, there is a constant flow of heat transfer medium into and out of the blancher 20 through the inlet and the outlet, which may also assist in cleaning of the blancher 20. The tank 24 is constructed and arranged to receive heat transfer medium such that the heat transfer medium can surround and contact the food product within at least the blanching compartment 52. In the blanching compartment 52, the heat transfer medium blanches or cooks the food product as the food product is advanced through the blanching compartment 52 by the auger 88.

The heat transfer medium comprises any number of liquids, non-liquids or a combination liquid/non-liquid medium, including, but not limited to water, steam, heated gas or vapor, water and steam, water and water vapor, etc. In the illustrated construction, the heat transfer medium is a liquid medium. In other constructions, in addition to or instead being supplied through the heat transfer medium inlet, the heat transfer medium may be supplied to the inner compartment 50 by a manifold (e.g., such as manifold 150) disposed in the inner compartment 50 and positioned above the axis 94 of the auger 88, which directly injects steam into the inner compartment 50.

As shown in FIGS. 2-3, a manifold 150 is positioned in the tank 24 above the axis 94 of the auger 88 and beyond the radial edge of the flights 104 of the auger 88. The manifold 150 is positioned below the height of the auger 88. In the illustrated construction, the manifold 150 is the positioned closer to one opposite side (e.g., the left side when viewed from the inlet end 32) of the inner wall 44 and is configured to inject fluid (see arrow A in FIG. 2) downwardly along one opposite side of the inner wall 44 and into the blanching compartment 52. The injected fluid generally follows the curve of the inner wall 44 to induce a swirling flow in the blanching compartment 52. In other constructions (not shown), the manifold 150 may be positioned on the opposite side (e.g., the right side), or a manifold 150 may be positioned on each side of the tank 24.

In the constructions shown in FIGS. 1-5, the manifold 150 is positioned within the passage 120 and injects fluid through the perforated wall portion 48 and down the associated side of the inner wall 44. The manifold 150 is supported in the central opening 128 in each support member 124.

Figure 6:
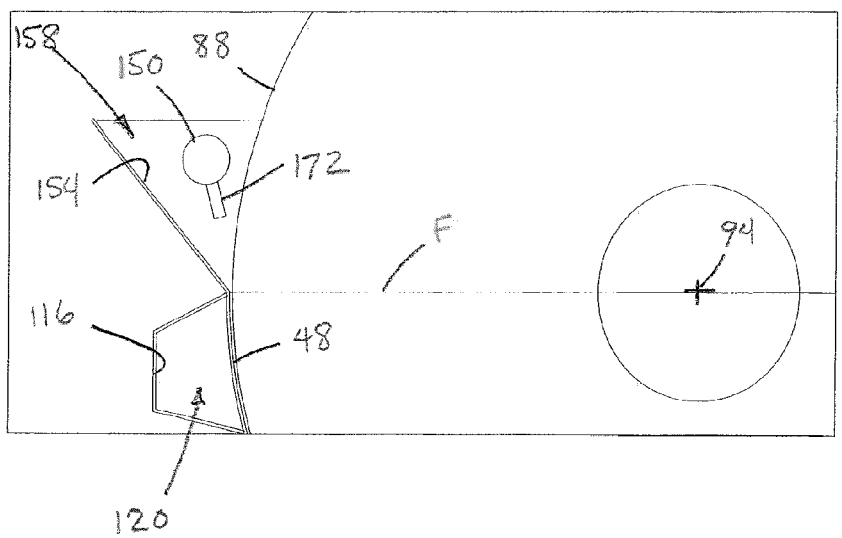
FIG. 6 is a schematic view of a portion of another alternative construction of the blancher.

In the construction illustrated in FIG. 6, the manifold 150 is not supported in the passage 120. In this construction, an outwardly-extending third wall portion 154 is circumferentially spaced from the second wall portion 116. The third wall portion 154 defines an axially-extending recess 158, and the manifold 150 is positioned in this recess 158 radially-outwardly of the radial edge of the auger flights 104. A perforated wall portion (not shown but similar to the perforated wall portion 48) may cover the recess 158 to allow fluid flow from the manifold 150 into the blanching compartment 52 and to help contain food product in a given auger section 106.

In the construction shown in FIG. 6, the passage 120 and the recess 158 are located on the same side of the blanching compartment 52. In other constructions, the passage 120 and the recess 158 may be circumferentially spaced apart a greater amount, for example, at least about 90 degrees. In one construction, the passage 120 is on the opposite side of the blanching compartment 52 (circumferentially spaced from the recess 158 by about 180 degrees).

The manifold 150 includes (see FIGS. 2 and 4-6) a plurality of injectors 172 (one shown), or agitators, directed into the blanching compartment 52. Directed flows, jets or streams of fluid are discharged from the injectors 172 into the blanching compartment 52. Fluid is supplied to the manifold 150 from a header (not shown), which receives fluid from a supply source (not shown). In one construction, the fluid source comprises a source of liquid, such as, for example, water, and, in another construction, the fluid source comprises a source of gas, such as, for example, air. Fluid is discharged from the injectors 172 with sufficient force to pass through the perforated wall portion 48 and displace the food product. The discharged fluid may displace food product in the blanching compartment 52, keep the food product off the inner wall 44 of the tank 24, breaks up clumps of food product, protect the food product from damage, reduce temperature variation in the food product, help increase heat transfer, etc.

In the illustrated construction, the injectors 172 are positioned to discharge fluid along the inner wall 44. In another construction, the injectors 172 may be positioned to discharge fluid generally toward the center of the tank 24. In yet another construction, at least some of the injectors 172 may be aimed at a target point where food product is known to congregate as the auger 88 rotates. In still another construction, the heat transfer medium may be distributed through the manifold 150 and injectors 172. One example of suitable injectors is further described in U.S. Pat. Nos. 6,214,400 and 6,234,066, the entire contents of which are hereby incorporated by reference.

To clean the tank 24, cleaning fluid is supplied to the inner compartment 50 of the tank 24 from a supply source (not shown) by a cleaning manifold 180 (see FIG. 1) disposed in the inner compartment 50 and positioned above the auger 88. Although only one manifold 180 is shown, in other constructions, more than one cleaning manifold 180 may be provided for cleaning. Cleaning fluid is discharged into the inner compartment 50 to clean the auger 88 and the tank 24 of contaminants, and the fluid and contaminants are drained from the inner compartment 50 through the outlet. The cleaning fluid any number of liquids or a combination liquid/non-liquid medium, including, but not limited to water, water and steam, water and water vapor, etc. Further, the cleaning manifolds 180 may be supplied with the same fluid as the manifolds 168.

As shown in FIG. 1, the blancher 20 also includes a transfer mechanism 190 to transfer food products from the blanching compartment 52, through the dewatering compartment 54 and out of the blancher 20. The illustrated transfer mechanism 190 may be similar to the transfer mechanisms shown and described in U.S. patent application Ser. No. 12/174,297, filed Jul. 16, 2008, and in U.S. patent application Ser. No. 12/501,649, filed Jul. 13, 2009, the entire contents of both of which are hereby incorporated by reference. The illustrated transfer mechanism 190 may also be similar to the cooling mechanisms shown and described in U.S. patent application Ser. No. 12/501,758, filed Jul. 13, 2009, the entire contents of which is also hereby incorporated by reference In general, the transfer mechanism 190 lifts food product within the blanching compartment 52 and discharges the food product out of the blancher 20, for example, for further processing, packaging etc. In some constructions, the transfer mechanism 190 may discharge the food product onto, for example, a cooling or drying rack, a transport device such as a conveyor belt or Ferris wheel-type apparatus, or another food processing system separate from the illustrated blancher 20.

Figure 7:
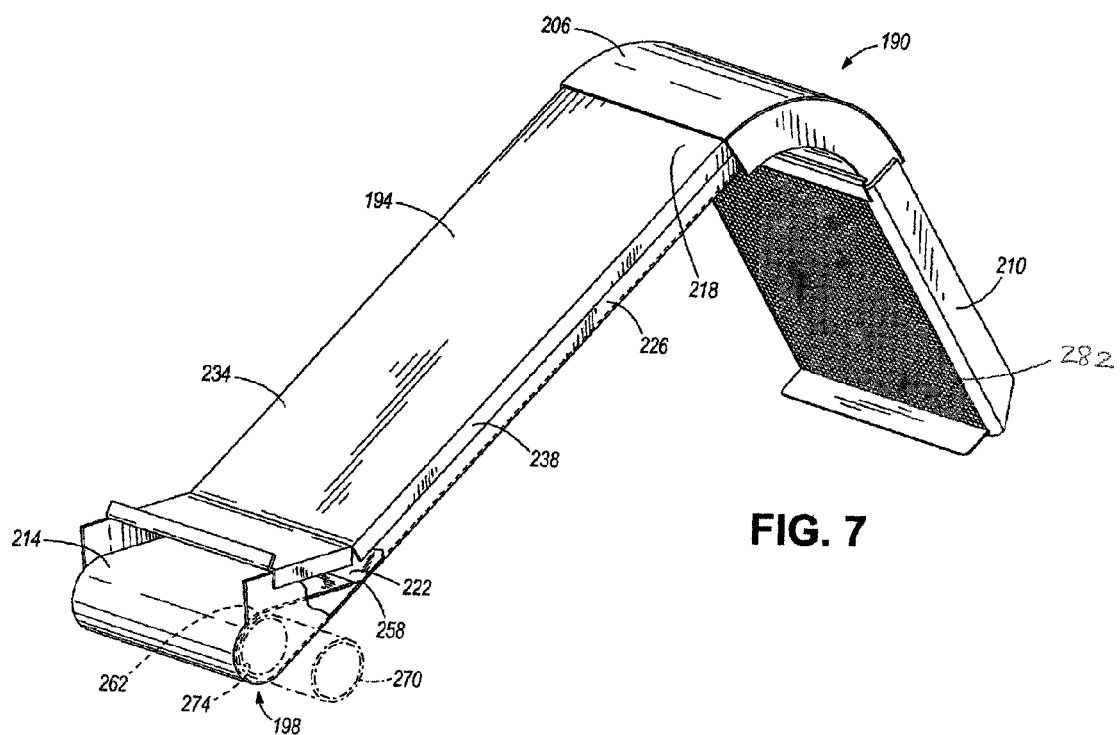
FIG. 7 is a perspective view of a transfer mechanism for use with the blancher shown in FIG. 1.
Figure 8:
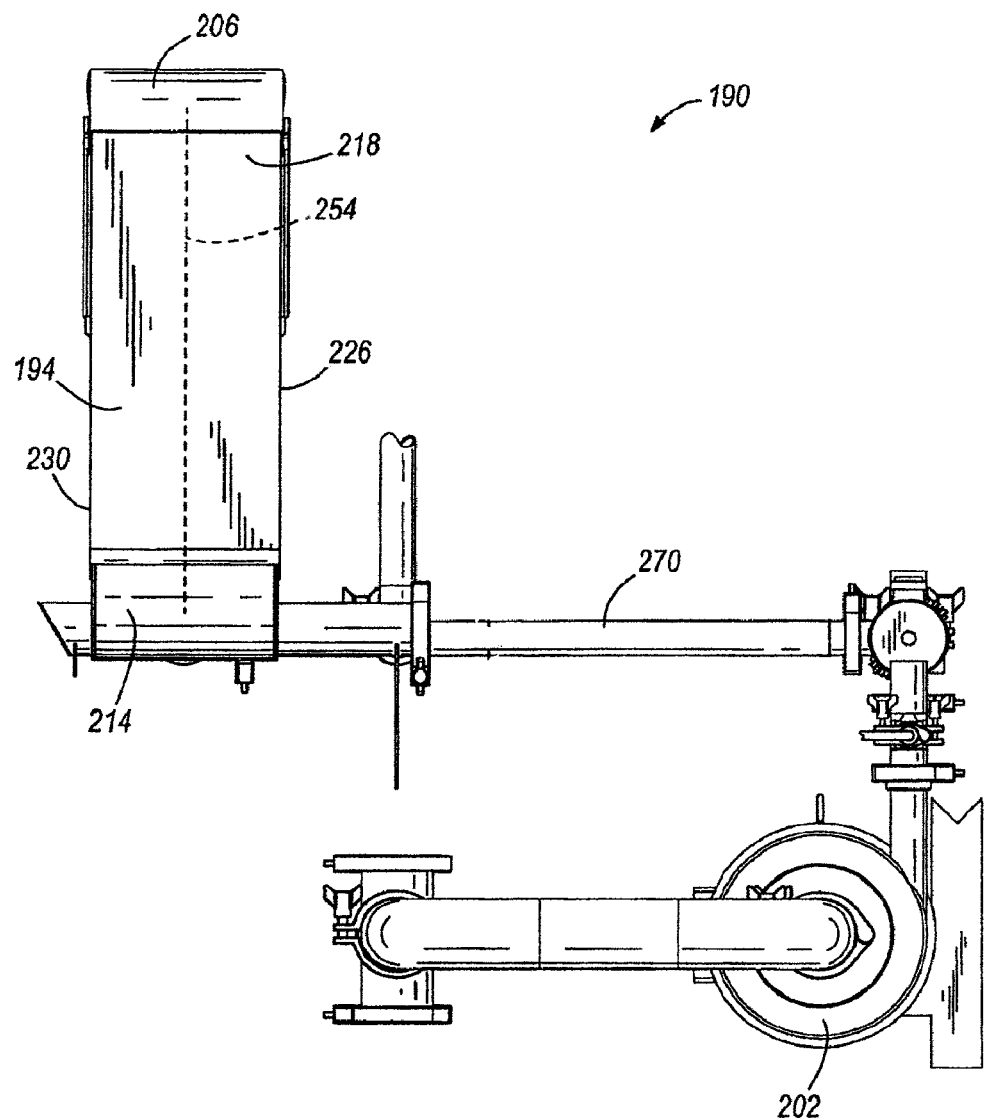
FIG. 8 is a front view of the transfer mechanism shown in FIG. 7.

FIGS. 7-8 illustrate a construction of the transfer mechanism 190 for use in the blancher 20. The illustrated transfer mechanism 190 is generally positioned in the dewatering compartment 54 of the tank 24. The transfer mechanism 190 includes a conduit 194, a fluid discharge 198, a pressurized fluid source 202 (FIG. 8), a convex guide member 206, and a dewatering member 210. The conduit 194 extends from an inlet portion 214, communicating with (see FIG. 1) the opening 68 in the intermediate wall 62, to an outlet portion 218, communicating with the convex guide member 206.

The conduit 194 includes a lower wall 222 and two side walls 226, 230 integrally formed as a three-sided member. An upper wall 234, or cover, is removably coupled to the side walls 226, 230. In the illustrated construction, the upper wall 234 includes lips 238 extending over portions of the side walls 226, 230 and is partially captured under the convex guide member 206 to help retain the upper wall 234 in place. In other constructions, the upper wall 234 may be coupled to the side walls 226, 230 with clamps, fasteners, etc. The walls 222, 226, 230, 234 of the illustrated conduit 194 are arranged such that the conduit 194 has a generally rectangular cross-section. In the illustrated construction, the width of the conduit 194 is substantially constant from the inlet portion 214 of the conduit 194 to the outlet portion 218. In other constructions (not shown), the width of the conduit 194 may change from the inlet end 214 to the outlet end 218.

As shown in FIG. 8, the conduit defines a central axis 254 extending from the inlet portion 214 to the outlet portion 218. The illustrated axis 254 and the conduit 194 (see FIG. 1) are in a central longitudinal plane extending through the tank 24 of the blancher 20. In other constructions, the axis 254 may be offset from and substantially parallel to or oblique to the central longitudinal plane extending through the tank 24.

As shown in FIG. 7, the fluid discharge includes a slot 258 positioned adjacent to the inlet portion 214 of the conduit 194. The illustrated slot 258 is formed by doubling over a portion of the lower wall 222 to form a generally teardrop-shaped opening 262. The slot 258 helps focus, and thereby pressurize, fluid from the fluid source 202 (FIG. 8), ensuring the fluid has sufficient flow strength to push food product upwardly through the conduit 194 to the outlet portion 218. The slot 258 provides a continuous discharge of fluid along the entire width of the conduit 194. In the illustrated construction, the slot 258 has a height of approximately ⅛" to help focus and pressurize the fluid. In other constructions, the height of the slot 258 may be relatively larger or smaller (e.g., from about 3/16" to about 1/16") to allow more or less fluid to simultaneously flow out of the slot 258. In still other constructions, the size of the slot 258 may be even larger or smaller depending upon the desired capacity of the transfer mechanism 190.

An outlet pipe 270 of the pressurized fluid source 202 (e.g., a pump) extends through an enlarged portion 274 of the teardrop-shaped opening 262. The outlet pipe 270 directs fluid from the pump 202, through the outlet pipe 270, and out of the slot 258. The fluid discharge 198 and the pump 202 generate a vacuum force at the inlet portion 214 of the conduit 194. The vacuum force helps draw food product through the opening 68 in the intermediate wall 62 and into the inlet portion 214 such that the pressurized fluid exiting the slot 258 can move the food product toward the convex guide member 206.

Figure 9:
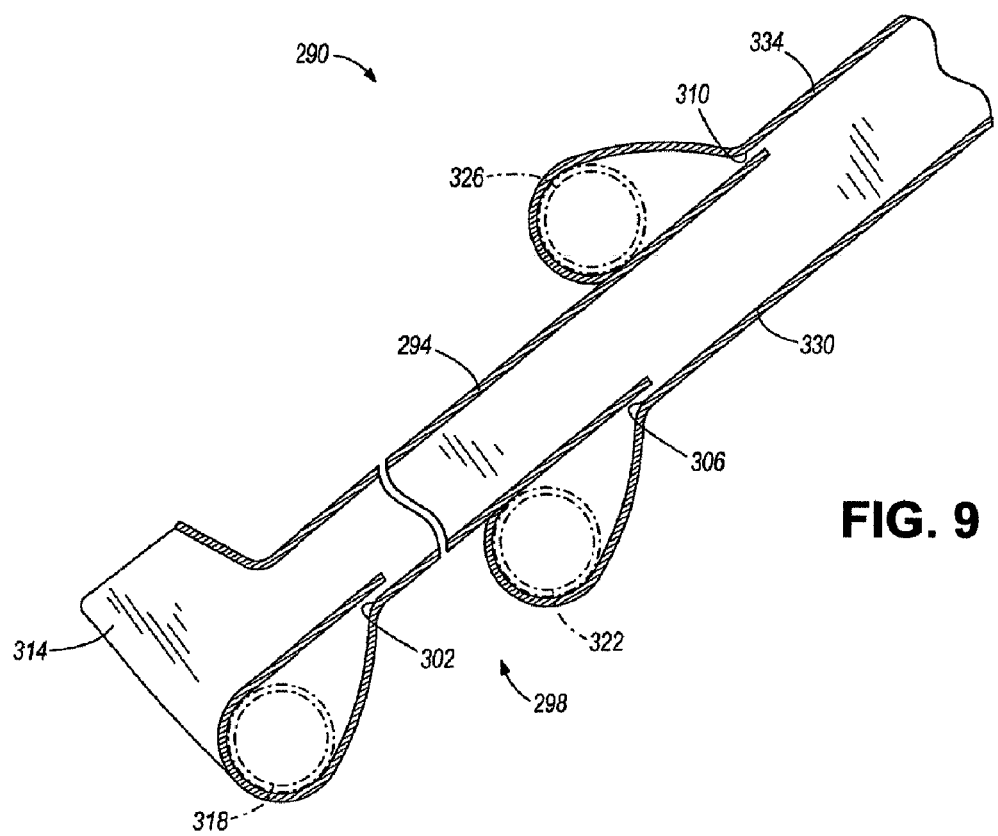
FIG. 9 is a cross-sectional view of another transfer mechanism for use with the blancher shown in FIG. 1.

In some constructions, the fluid discharge 198 may include two or more slots positioned along the conduit 194. For example, FIG. 9 illustrates a conduit 294 of a fluid transfer mechanism 290 according to another embodiment of the invention. In the constructions shown in FIG. 9, a fluid discharge 298 of the transfer mechanism 290 includes three slots 302, 306, 310 spaced apart along the conduit 294 between an inlet portion 314 and an outlet portion. Each slot 302, 306, 310 is substantially similar to the slot 258 discussed above and is in communication with a separate outlet pipe 318, 322, 326 from a pressurized fluid source.

As shown in FIG. 9, the first slot 302 is directly adjacent to the inlet portion 314 of the conduit 294 (similar to the slot 258 discussed above), the second slot 306 is formed on a lower wall 330 of the conduit 294 downstream of the first slot 302, and the third slot 310 is formed on an upper wall 334 of the conduit 294 downstream of the second slot 306. In other constructions, the relative positioning of the slots 302, 306, 310 may be altered. For example, all of the slots 302, 306, 310 may be positioned along a single wall of the conduit 294 (e.g., either the lower wall 330 or the upper wall 334), or the slots 302, 306, 310 may be positioned on the conduit 294 alternating between the lower wall 330 and the upper wall 334. In further constructions, the fluid discharge 298 may only include two slots either positioned on the same wall of the conduit 294 or on opposite walls. For example, the fluid discharge 298 may include the first and second slots 302, 306 or may include the first and third slots 302, 310.

The illustrated slots 302, 306, 310 help propel food product through the conduit 294 over a longer distance. For example, while the single slot construction discussed above is operable to lift food product between about 11" and 18", or higher, above the fluid level F in the tank 24, two or more slots may be employed to lift the food product even higher above the fluid level F. Additional slots may be formed in a conduit, as necessary, to lift food product to a desired height above the fluid level F.

Referring to FIGS. 7-8, the convex guide member 206 is an arcuate conduit portion positioned adjacent to and in communication with the outlet portion 218 of the conduit 194. The convex guide member 206 receives food product and fluid from the conduit 194 and redirects the food product and the fluid downwardly toward the dewatering member 210. The illustrated convex guide member 206 is configured such that the conduit 194, the convex guide member 206, and the dewatering member 210 form a generally inverted V-shape, as shown in FIG. 7.

As shown in FIG. 7, the dewatering member 210 is coupled to and in communication with the convex guide member 206. The illustrated dewatering member 210 separates the food product from the fluid and directs the food product out of the blancher 20 and onto a discharge chute 36 (FIG. 1) at the outlet end 40 of the tank 24. In the illustrated construction, the dewatering member 210 includes a screen 282. The screen 282 is inclined to define a ramp for food product to tumble (e.g., slide and/or roll) downwardly along. For example, the illustrated screen 282 is inclined to define a surface substantially parallel to the direction of flow of the food product exiting the convex guide member 206, reducing turbulence and disruption of the flow from the convex guide member 206 to the dewatering member 210.

The screen 282 also defines openings for the fluid to fall through under the influence of gravity into the dewatering compartment 54 (see FIG. 1). The openings are smaller than the food product so that, as the fluid falls through the screen 282, the food product is retained on the screen 282 and continues toward the discharge chute 36. In some constructions, a portion of the conduit 194 and/or the convex guide member 206 may also be a screen to facilitate dewatering the food product.

In operation, referring to FIG. 1, uncooked food product is inserted into the blancher 20 through the inlet end 32 of the tank 24. The auger 88 is rotated to move the uncooked food product through the hot heat transfer medium in the blanching compartment 52. As the food product moves through the heat transfer medium, the food product becomes cooked. The food product travels through the blanching compartment 52 until reaching the intermediate wall 62. The vacuum force generated by the fluid discharge 198 and the pump 202 of the transfer mechanism 190 pulls the cooked food product through the opening 68 in the intermediate wall 62 and into the conduit 194 of the transfer mechanism 86.

Referring to FIGS. 7-8, once the food product is pulled into the conduit 194, the pressurized fluid exiting the slot 258 lifts and pushes the food product against the force of gravity to move the food product toward the convex guide member 206. The food product and the fluid flow through the convex guide member 206 and onto the dewatering member 210. At this time, the food product tumbles down the dewatering member 210 and is discharged from the blancher 20 via the discharge chute 36 (see FIG. 1). The discharge chute 36 then directs the food product to a packaging system or another food processing system. The separated fluid falls through the screen 282 of the dewatering member 210 and into the dewatering compartment 54. The separated fluid may be returned to the blanching compartment 52 to be used to help cook more food product in the blanching compartment 52. Alternatively, the separated fluid may be discharged from the blancher 20 through the outlet.

As the transfer mechanism 190 operates to draw food product into the conduit 194, fluid in auger section 106 proximate the intermediate wall 62 is also drawn into the conduit 194. This could result in a drop in the fluid level in that auger section 106. However, because fluid is able to pass between auger sections 106, in the illustrated construction, through the perforated wall portion 48 and into and through the passage 120, the fluid level F is maintained substantially equal in all of the auger sections 106.

Figure 10:
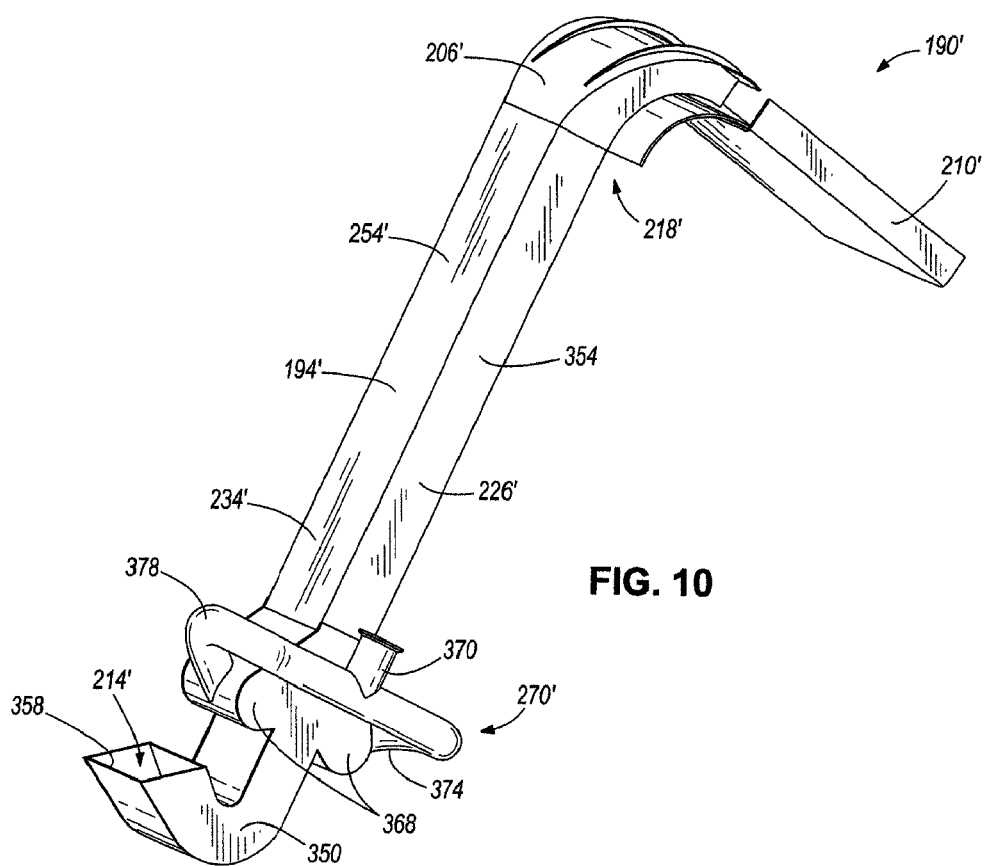
FIG. 10 is a perspective view of a yet another transfer mechanism for use with the blancher shown in FIG. 1.
Figure 11:
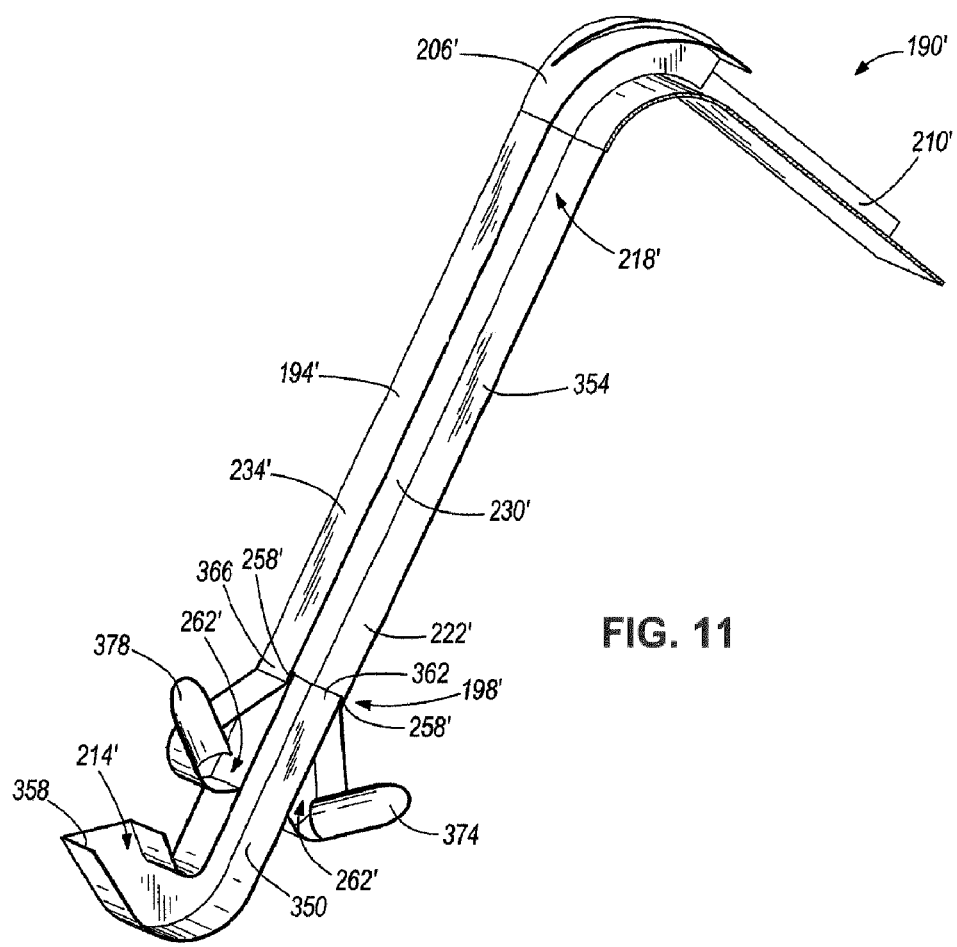
FIG. 11 is a cross-sectional view of the transfer mechanism shown in FIG. 10.
Figure 12:
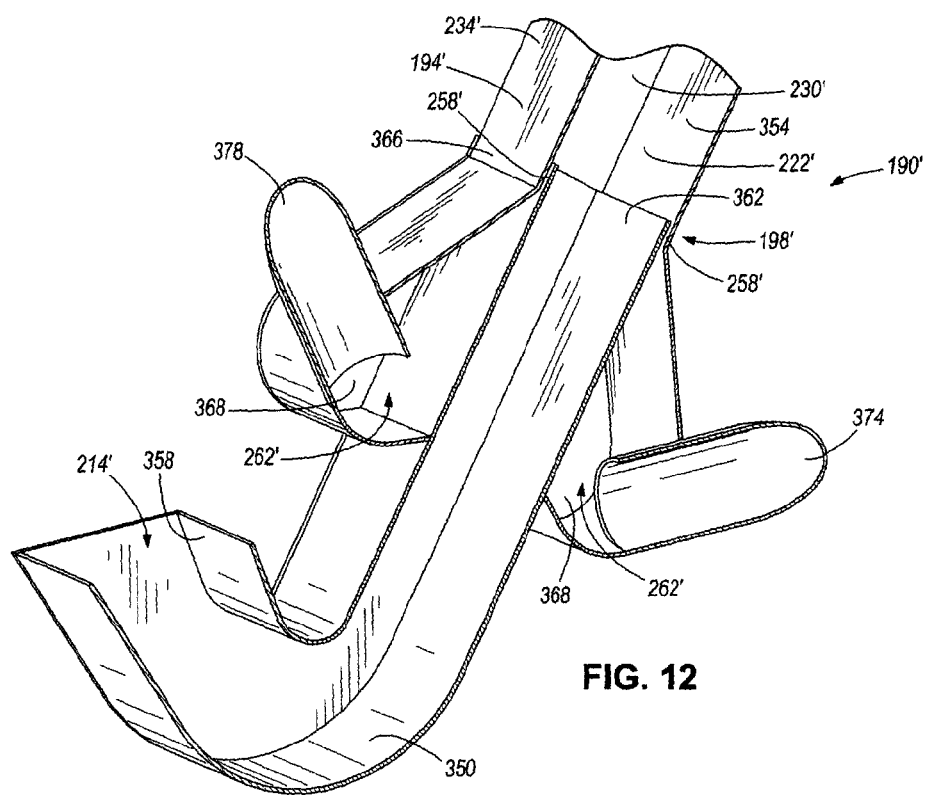
FIG. 12 is an enlarged cross-sectional view of a portion of the transfer mechanism shown in FIG. 11.

FIGS. 10-12 illustrate yet another alternative construction of a transfer mechanism 190'. The illustrated transfer mechanism 190' is similar to the transfer mechanisms 190, 290 discussed above with respect to FIGS. 7-9. Common elements have the same reference numbers "'". Reference is made to the description of the transfer mechanisms 190, 290 above for details of the structures and operation, as well as alternatives to the structures and operation, of the transfer mechanism 190' not specifically discussed herein.

In the illustrated construction, the transfer mechanism 190' generally includes a dual opposing slot discharge arrangement. The illustrated transfer mechanism 190' includes a conduit 194', a fluid discharge 198' (shown in FIGS. 11-12), a pressurized fluid source (not shown but similar to the pressurized fluid source 202 shown FIG. 8), a convex guide member 206', and a dewatering member 210'.

Similar to the conduits 194, 294 of the transfer mechanisms 190, 290 discussed above, the illustrated conduit 194' has a generally rectangular cross-section. In the illustrated construction, the width of the conduit 194' is substantially constant from an inlet portion 214' of the conduit 194' to an outlet portion 218'. The conduit 194' includes a lower wall 222', side walls 226', 230' and an upper wall 234'. The conduit 194' defines a central axis 254' extending from the inlet portion 214' to the outlet portion 218'. The axis 254' and the conduit 190' may be in, offset from and substantially parallel to, or oblique to the central longitudinal plane extending through the tank 24.

In the illustrated construction, the conduit 194' includes an inlet conduit section 350 providing the inlet portion 214' and a main conduit section 354 connected to the inlet conduit section 350 and providing the outlet portion 218'. As shown in FIGS. 11-12, a first end 358 of the inlet conduit section 350 is in communication with (see FIG. 1) the blanching compartment 52 through the opening 68 in the intermediate wall 62 and below the fluid level F in the blanching compartment 52. A second end 362 (see FIGS. 11-12) of the inlet conduit section 350 fits within or is inserted into a first end 366 of the main conduit section 354. As discussed below in more detail, the inlet conduit section 350 and the main conduit portion 354 cooperate to define the fluid discharge 198'. In the illustrated construction, the inlet conduit section 350 is generally V-shaped, and the main conduit section 354 is generally inclined toward the outlet portion 218'.

In the illustrated construction, the fluid discharge 198' includes a pair of opposing slots 258' positioned proximate the inlet portion 214' of the conduit 194'. The illustrated slots 258' are vertically spaced apart, generally on the top and bottom of the conduit 194' (proximate the lower wall 222' and the upper wall 234'). In other constructions (not shown), in addition to or instead of the top and bottom slots 258', laterally spaced apart slots may be provided on the opposite sides of the conduit 194' (proximate each side wall 226', 230'). Each slot 258' is defined between an outer surface of the second end 362 of the inlet conduit section 350 and an inner surface of a first end 366 of the main conduit section 354.

Similar to the slot 258 discussed above, each slot 258' helps focus, and thereby pressurize, fluid from the fluid source, ensuring the fluid has sufficient flow strength to push food product upwardly through the conduit 194' to the outlet portion 218'. The slots 258' provide a continuous discharge of fluid along the entire width of and at the top and bottom of the conduit 194'. In the illustrated embodiment, each slot 258' has a height of approximately $\frac{1}{8}$" to help focus and pressurize the fluid. In other constructions, the height of each slot 258' may be relatively larger or smaller (e.g., from about $\frac{3}{16}$" to about $\frac{1}{16}$") to allow more or less fluid to simultaneously flow out of the slot 258'. In still other constructions, the size of the slot 258' may be even larger or smaller depending upon the desired capacity of the transfer mechanism 190'.

Each slot 258' is formed between the outer surface of the inlet conduit section 350 and the adjacent inner surface of the main conduit section 354. A portion of the associated wall (e.g., the lower wall 222' and the upper wall 234') of the main conduit section 354 may be bent to form, in cooperation with the outer surface of the inlet conduit section 350 and with side walls 368, a generally teardrop-shaped chamber or opening 262'.

An outlet pipe 270' of the pressurized fluid source (e.g., a pump (not shown)) is in fluid communication with each opening 262'. The outlet pipe 270' includes a main pipe 370 which branches off into a pipe section 374, 378 connected to each opening 262'. In the illustrated construction, the pipe sections 374, 378 extend through the associated wall 222', 234' of the conduit 194' and into the associated opening 262'. The outlet pipe 270' directs fluid from the pump, through the main pipe 370 and through the pipe sections 374, 378, into each opening 262', and out of each slot 258'. In other constructions (not shown), a separate pipe may be in fluid communication between the pump and each opening 262'.

Similar to the transfer mechanism 190 discussed above, the fluid discharge 198' and the pump generate a vacuum force at the inlet portion 214' of the conduit 194'. The vacuum force helps draw food product through the opening 68 in the intermediate wall 62 and into the inlet portion 214' such that the pressurized fluid exiting the slots 258' can move the food product toward the outlet portion 218'.

In the illustrated construction, the dual opposing slot arrangement of the transfer mechanism 190' effectively doubles the width of the plenum when compared to the transfer mechanism 190. To maintain the same flow rate, the width of the conduit 194' is reduced relative to the width of the conduit 194 (e.g., by about one half), and the depth is increased (e.g., approximately doubled). The dual opposing slot arrangement minors the fluid flow effect with each slot 254' (e.g., at the top and bottom of the conduit 194') which may keep food product toward the middle of the conduit 194' (away from the wall associated with each slot 258'). This arrangement also may allow a larger opening for the inlet portion 214' to accommodate larger-sized food products (e.g., larger than about 1" in diameter).

In the transfer mechanism 190', the slots 258' may be positioned relatively farther away from the inlet portion 214' (when compared to the transfer mechanism 190) to allow the food product to accelerate before the transition to full flow rate near the slots 258' so that this transition is not as abrupt. The added distance (approximately 15") generally enables the food product to accelerate before hitting the high velocity transition at the location of the slot 258'.

With the slotted arrangement, the velocity of the fluid ejected from each slot 258' is greater generally toward the center of the slot 258' (between the inner surface of a first end 366 of the main conduit section 354 and the outer surface of the second end 362 of the inlet conduit section 350) and decreases toward the middle of the conduit 194' (and toward the associated wall (e.g., wall 222' or 234')). The food product tends to stay toward the middle of the conduit 194' in an area of lower flow rate fluid. This may contribute to the slotted arrangement being gentler on food products.

The main conduit section 354 is connected to the convex guide member 206' and to the dewatering member 210'. In the illustrated construction, the dewatering member 210' may have generally the same size and shape as the dewatering member 210 in the transfer mechanism 190. However, because the conduit 194' has a relatively narrower width and increased depth compared to the conduit 194, the convex guide member 206' generally flares to the width of and tapers to the depth of the dewatering member 210'.

Figure 13:
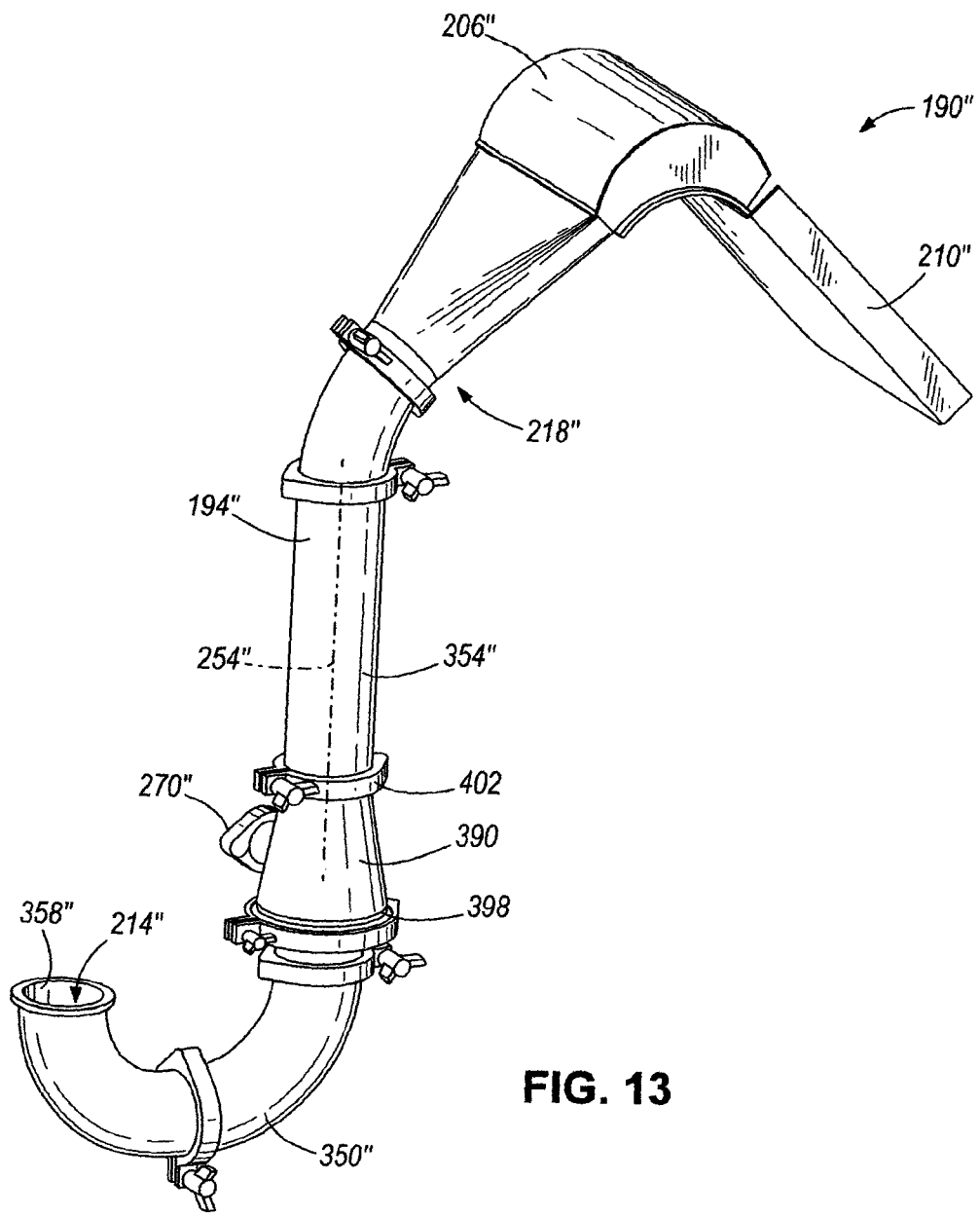
FIG. 13 is a perspective view of another transfer mechanism for use with the blancher shown in FIG. 1.
Figure 14:
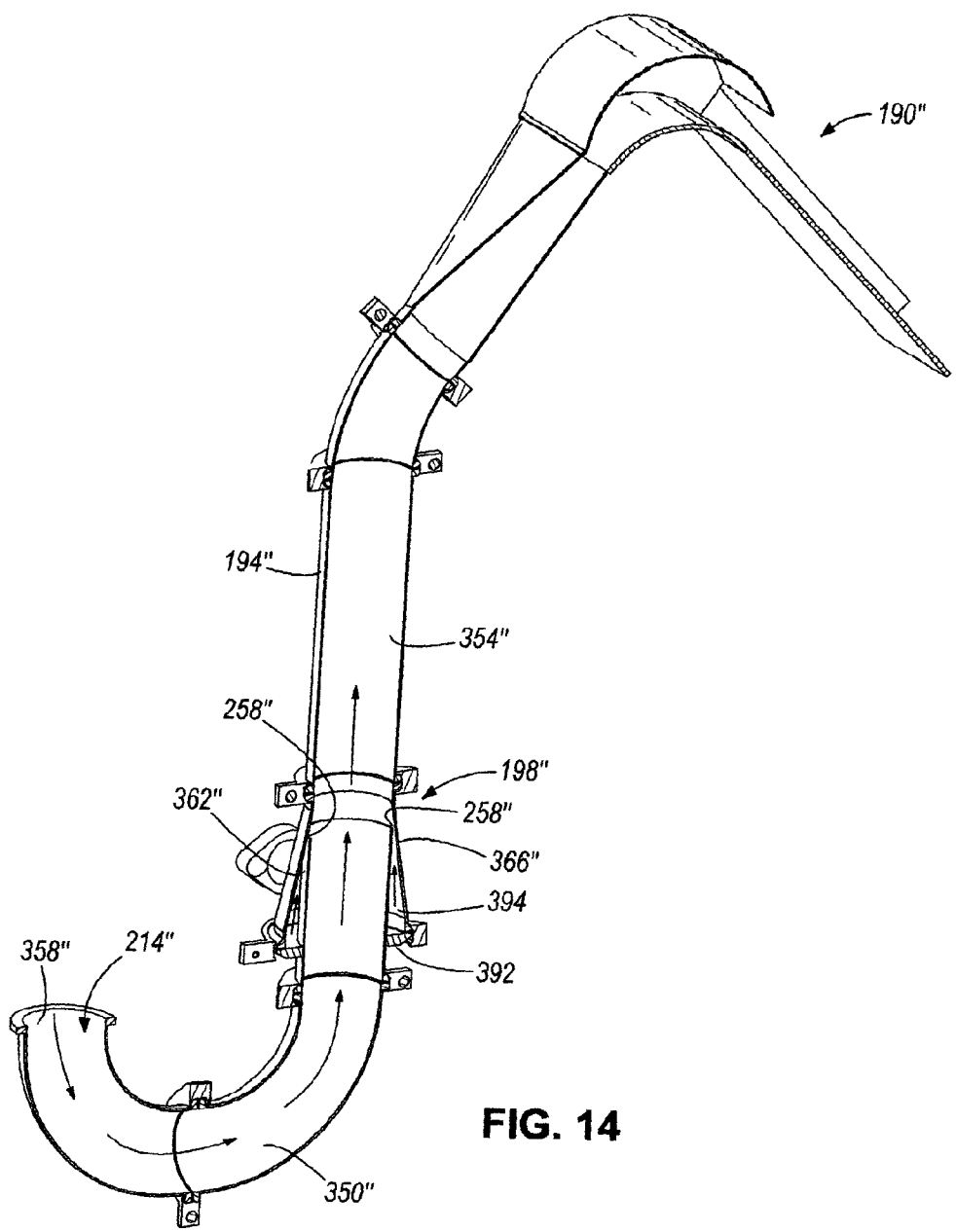
FIG. 14 is a cross-sectional view of the transfer mechanism shown in FIG. 13.
Figure 15:
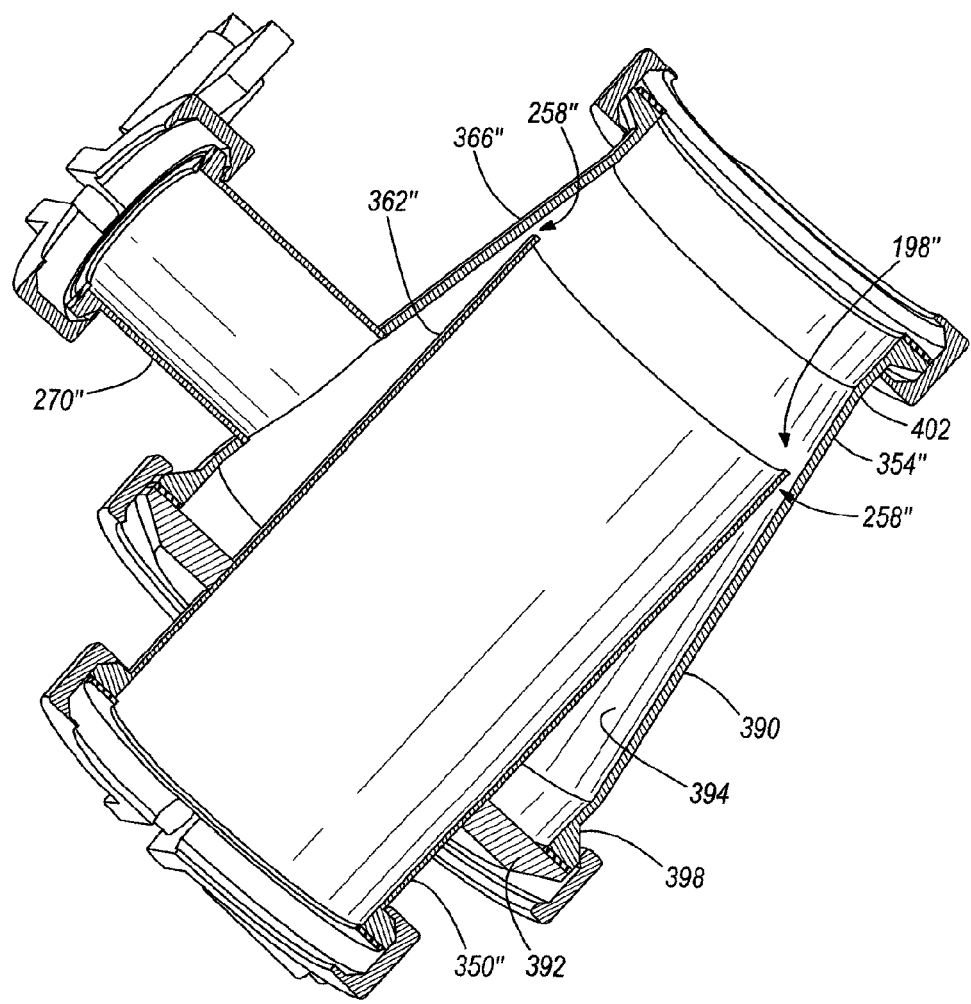
FIG. 15 is an enlarged cross-sectional view of a portion of the transfer mechanism shown in FIG. 14.

FIGS. 13-15 illustrate another alternative construction of a transfer mechanism 190". The illustrated transfer mechanism 190" is similar to the transfer mechanisms 190, 290, 190' discussed above with respect to FIGS. 7-12. Common elements have the same reference numbers """. Reference is made to the description of the transfer mechanisms 190, 290, 190' above for details of the structures and operation, as well as alternatives to the structures and operation, of the transfer mechanism 190" not specifically discussed herein.

In the illustrated construction, the transfer mechanism 190" includes a generally round conduit 194" with an annular discharge arrangement. The illustrated transfer mechanism 190" includes a conduit 194", a fluid discharge 198" (shown in FIGS. 14-15), a pressurized fluid source (not shown but similar to the pressurized fluid source 202 shown FIG. 8), a convex guide member 206", and a dewatering member 210".

As mentioned above, the illustrated conduit 194" has a generally round cross-section. In the illustrated construction, the diameter of the conduit 194" is substantially constant from an inlet portion 214" of the conduit 194" to an outlet portion 218". The conduit 194" defines a central axis 254" extending from the inlet portion 214" to the outlet portion 218". The axis 254", and thereby the conduit 194", may be in, offset from and substantially parallel to or oblique to the central longitudinal plane extending through the tank 24 of the blancher 20.

In the illustrated construction, the conduit 194" includes an inlet conduit section 350" providing the inlet portion 214" and a main conduit section 354" connected to the inlet conduit section 350" and providing the outlet portion 218". As shown in FIGS. 14-15, a first end 358" of the inlet conduit section 350" is in communication with (see FIG. 1) the blanching compartment 52 through the opening 68 in the intermediate wall 62 and below the fluid level F in the blanching compartment 52. A second end 362" (see FIGS. 14-15) of the inlet conduit section 350" fits within or is inserted into a first end 366" of the main conduit section 354". As discussed below in more detail, the inlet conduit section 350" and the main conduit portion 354" cooperate to define the fluid discharge 198". In the illustrated construction, the inlet conduit section 350" is generally U-shaped, and the main conduit section 354" includes a substantially vertical portion.

In the illustrated construction, the fluid discharge 198" includes an annular slot 258" positioned proximate the inlet portion 214" of the conduit 194". The illustrated slot 258" extends substantially about the perimeter of the second end 362" of inlet conduit section 350". The slot 258" is defined between an outer surface of the second end 362" of the inlet conduit section 350" and an inner surface of a first end 366" of the main conduit section 354". In other constructions (not shown), the fluid discharge 198" may include one or more slots which extend only about a portion of the circumference.

Similar to the slot 258, 258', discussed above, the slot 258" helps focus, and thereby pressurize, fluid from the fluid source, ensuring the fluid has sufficient flow strength to push food product upwardly through the conduit 194" to the outlet portion 218". The slot 258" provides a continuous discharge of fluid about the circumference of interior of the conduit 194". In the illustrated embodiment, the slot 258" has a height of approximately ⅛" to help focus and pressurize the fluid. In other constructions, the height of the slot 258" may be relatively larger or smaller (e.g., from about 3/16" to about 1/16") to allow more or less fluid to simultaneously flow out of the slot 258". In still other constructions, the size of the slot 258" may be even larger or smaller depending upon the desired capacity of the transfer mechanism 190".

As mentioned above, the slot 258" is formed between the outer surface of the inlet conduit section 350" and the adjacent inner surface of the main conduit section 354". The main conduit section 354" includes a conical portion 390 surrounding a portion of the outer surface of the inlet conduit section 350" upstream of the slot 258" to form, with an end plate 392, a chamber 394 surrounding the portion of the inlet conduit section 350". An outlet pipe 270" of the pressurized fluid source (e.g., a pump (not shown)) is in fluid communication with the chamber 394. The outlet pipe 270" directs fluid from the pump, into the chamber 394 and out of the slot 258".

The conical portion 390 has a first diameter section 398 with a diameter larger than the outer diameter of the inlet conduit section 350" and tapers to a second diameter section 402 having a diameter about equal to the inner diameter of the inlet conduit section 350". The inlet conduit section 350" is inserted to position between the first diameter section 398 and the second diameter section 402 to define the slot 258" with the desired height. With this arrangement, the conduit 194" generally has the same interior diameter throughout the inlet conduit section 350 and the main conduit section 354".

Similar to the transfer mechanisms 190, 290, 190' discussed above, the fluid discharge 198" and the pump generate a vacuum force at the inlet portion 214" of the conduit 194". The vacuum force helps draw food product through the opening 68 in the intermediate wall 62 and into the inlet portion 214" such that the pressurized fluid exiting the slot 258" can move the food product toward the outlet portion 218".

The annular slot arrangement provides the fluid flow effect around the circumference of the interior of the conduit 194" which tends to keep food product toward the middle of the conduit 194" (and away from the wall of the conduit 194"). This arrangement also may allow a larger opening for the inlet portion 214" to accommodate larger-sized food products (e.g., larger than about 1" in diameter).

In the transfer mechanism 190", the slot 258" may be positioned relatively farther away from the inlet portion 214" (when compared to the transfer mechanisms 190, 190') to allow the food product to accelerate before the transition to full flow rate near the slot 258" so that this transition is not as abrupt. The added distance (approximately 25") generally enables the food product to accelerate before hitting the high velocity transition at the location of the slot 258".

Also, with the annular slot arrangement, the velocity of the fluid ejected from the slot 258" is greater generally toward the center of the slot 258" (between the inner surface of a first end 366" of the main conduit section 354" and the outer surface of the second end 362" of the inlet conduit section 350") and decreases toward the middle of the conduit 194" (and toward the wall of the conduit 194"). The food product tends to stay toward the middle of the conduit 194" in an area of lower flow rate fluid. Again, this may contribute to the slot arrangement being gentler on food products.

The round shape of the conduit 194" may provide increased flexibility with respect to, for example, sanitation, orientation, etc. As mentioned above, the round shape of the conduit 194" provides a flow effect that is annular about the circumference of the interior of the conduit 194". The round conduit 194" may be gentler on food products but also may be more efficient, have greater capacity, provide higher lift, provide easier piping opportunities, etc.

With the round conduit 194", the transfer mechanism 190" may enable the food product to be lifted vertically through a significant portion of the conduit 194". The vertical portion of the conduit 194" generally decreases the overall length of the transfer mechanism 190" and the space requirement in the blancher 20.

The round main conduit section 354" is connected to the convex guide member 206" and to the generally rectangular dewatering member 210". In the illustrated construction, the dewatering member 210" may have generally the same size and shape as the dewatering member 210, 210' in the transfer mechanisms 190, 190'. However, because the conduit 194" has a round cross-section with a diameter that is smaller than the width and greater than the depth of the generally rectangular conduit 194, the convex guide member 206" (and/or the downstream end of the main conduit section 354") transitions from the round cross-section of the conduit 194" to the rectangular cross-section of the dewatering member 210". The convex guide member 206" also generally flares to the width of and tapers to the depth of the dewatering member 210".

Figure 16:
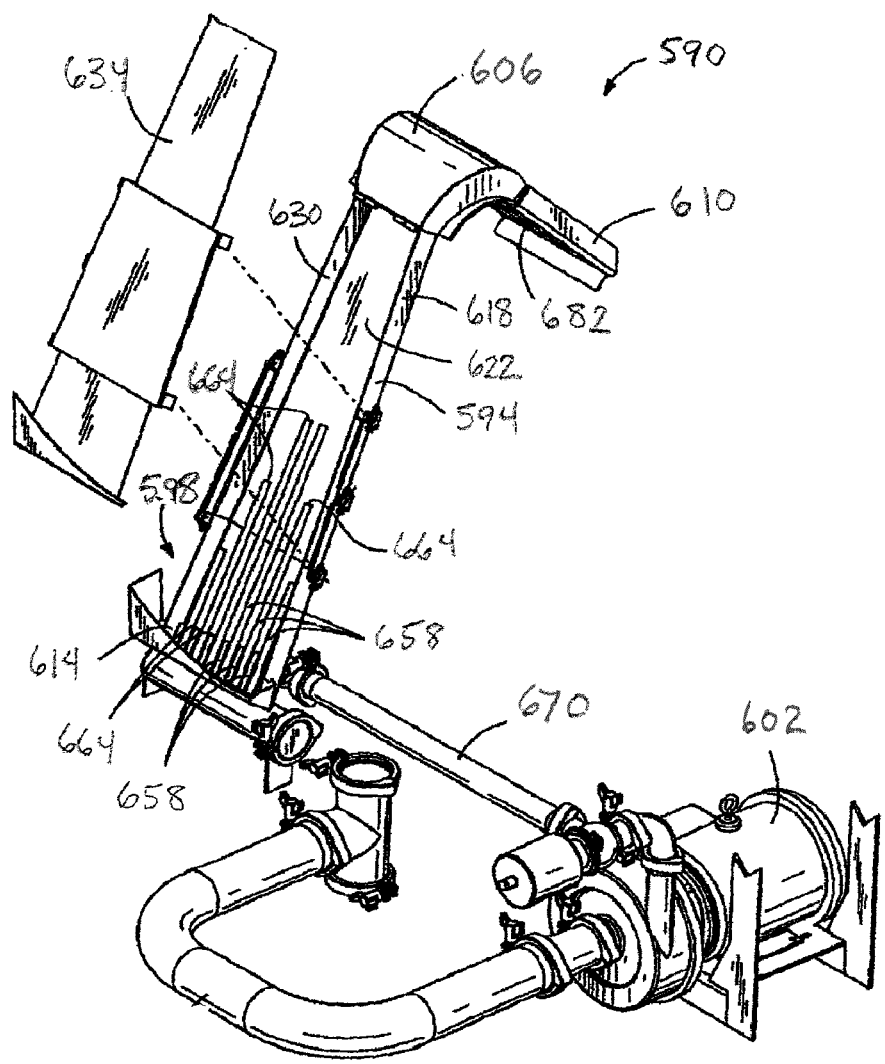
FIG. 16 is a perspective view of yet another transfer mechanism for use with the blancher shown in FIG. 1.
Figure 17:
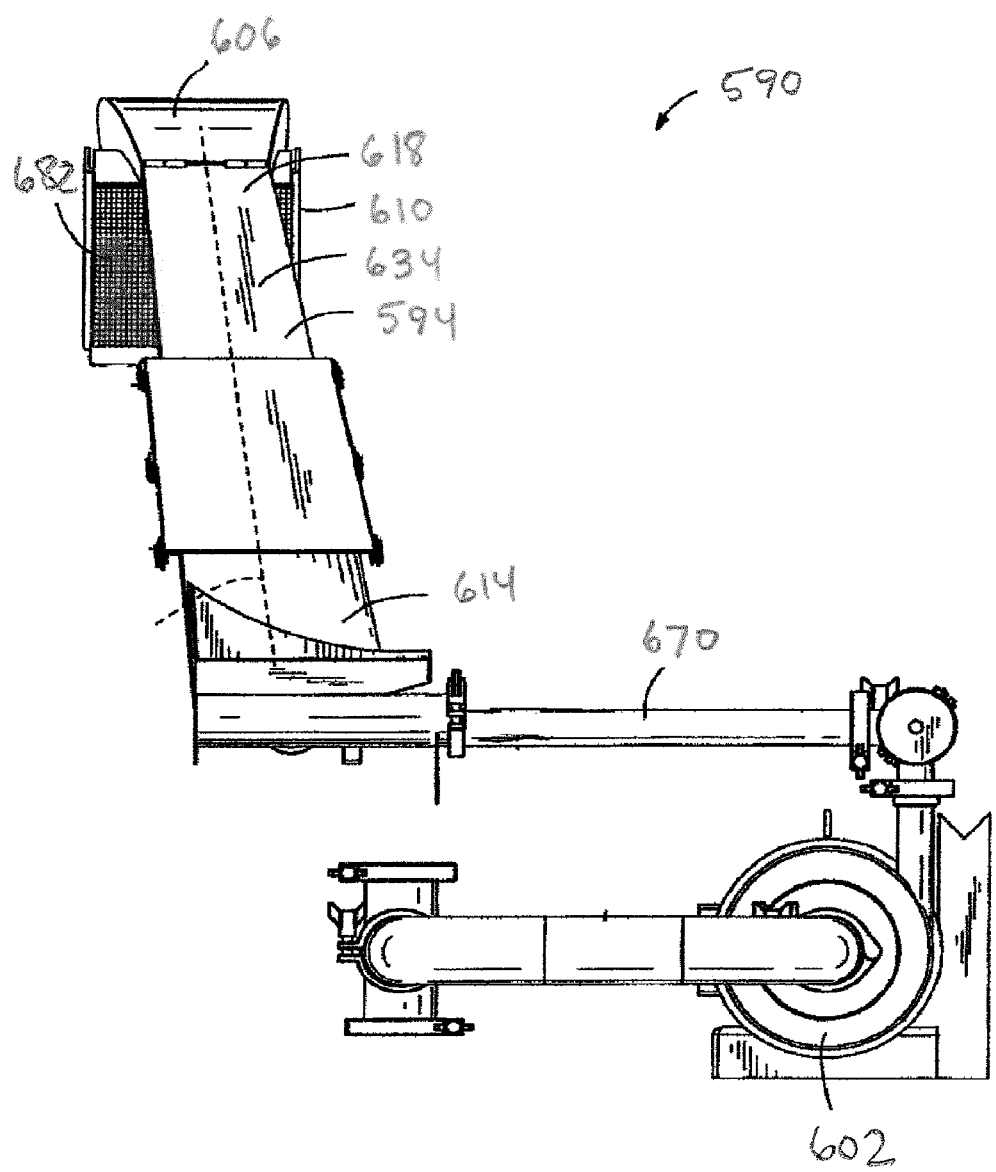
FIG. 17 is a front view of the transfer mechanism shown in FIG. 16.

FIGS. 16-17 illustrate a further alternative construction of a transfer mechanism 590. The illustrated transfer mechanism 590 is similar to the transfer mechanisms 190, 290, 190', 190" discussed above with respect to FIGS. 7-15. Common elements have the same reference numbers increased by 400. Reference is made to the description of the transfer mechanisms 190, 290, 190', 190" above for details of the structures and operation, as well as alternatives to the structures and operation, of the transfer mechanism 590 not specifically discussed herein.

Generally, rather than the slot(s) 258, 258', 258", the fluid discharge 598 of the transfer mechanism 590 includes one or more nozzles 658, each having an outlet 664. The nozzle(s) 658 and the pump 602 generate a vacuum force at the inlet portion 614 of the conduit 94. The vacuum force helps draw food product through the opening 68 in the intermediate wall 62 and into the inlet portion 614 such that the pressurized fluid exiting the nozzle(s) 658 can move the food product toward the outlet portion 618.

In some construction, the blancher 20 could be used in a combination cooker-cooler. In such a construction, the blancher 20 can provide the cooker portion, and the transfer mechanism 190 can transfer the food product from the cooker portion to the cooler portion. Another transfer mechanism, which may be similar to the transfer mechanism 190, may be provided to transfer food product from the cooler portion.

In some constructions, the cooler portion can have a construction which is substantially similar to the structure of the blancher 20, though operated with a cool heat transfer medium. In other constructions, the cooler portion may be similar to the cooler shown in U.S. patent application Ser. No. 12/501,758, filed Jul. 13, 2009, the entire contents of which are hereby incorporated by reference.

The blancher 20 may improve the efficiency of food processing within a facility. The blancher 20 may have improved overall cleanability and user-friendliness. Also, in the blancher 20, the perforated wall portion 48 (and/or the auger perforated wall portion 132) may provide improved fluid balancing in the blancher compartment 52.

Due to the ease of accessing, moving and cleaning the tank 24 and components, machine down time between product runs and the amount of labor required to facilitate cleaning is reduced. Further, the design of the blancher 20 may allow greater access to the tank bottom for cleaning contaminant accumulation and facilitates use of an automated cleaning system. As a result, more batches of food product may be processed during a single day or shift.

Further, the blancher 20 may have an increased capacity for processing foods but also gently handles the food product advanced through the tank 24. Directed flow of fluid from the manifold 150 into the compartment 56 may reduce temperature variation in the food product, may help fluidize food product within the compartment 56, and may allow additional food product to be deposited in the compartment 56 because the food product does not rest on the sidewall of the compartment 56. Thus, the food processing apparatus described above may process a volume of food product typically processed in a larger machine, while occupying less floor space.

In the blancher 20, very tight tolerances between the inner wall 44 and the auger flights 104 may prevent damage to food product because there is not sufficient room for food product to become stuck between the inner wall 44 and the auger flights 104. Further, the tight tolerance will not decrease a clearance between the two due to wear and may prevent metal-to-metal contact between the tank 24 and the auger 88.

One or more independent features and independent advantages of the invention may be set forth in the following claims:

What is claimed is:
1. A food processing apparatus comprising:
a tank having an inlet end for receiving food product and an outlet end for discharging food product, the tank having an inner wall defining a compartment and including a solid, imperforate wall portion, fluid being contained in the compartment;
a rotatable auger mounted in the compartment, the auger for advancing food product within the compartment from the inlet end toward the outlet end, the auger including flights having a flight wall with a radial edge, the flight wall separating a first auger section from a second auger section, a clearance space being defined between the radial edge of the flights and the solid, imperforate wall portion of the inner wall;

wherein the clearance space inhibits the flow of fluid between the first auger section and the second auger section, wherein one of the inner wall and the flight wall includes a perforated wall portion, and wherein flow of fluid between the first auger section and the second auger section is provided through the perforated wall portion, and a transfer mechanism positioned at the outlet end of the tank, the transfer mechanism including a conduit at least partially positioned in the tank and including a first end portion configured to be in communication with the compartment and a second end portion, a fluid discharge positioned substantially within the conduit between the first end portion and the second end portion, and a pressurized fluid source in communication with the fluid discharge, the pressurized fluid source operable to propel a fluid through the fluid discharge to move food product from the first end portion of the conduit toward the second end portion of the conduit.

2. The food processing apparatus of claim 1, wherein the inner wall of the tank includes the perforated wall portion, the tank having a tank wall providing the solid, imperforate wall portion and, relative to the solid, imperforate wall portion, an outwardly-extending second wall portion, a passage being defined between the perforated wall portion and the second wall portion, the passage extending in a direction of the inlet end and the outlet end, the passage extending at least between the first auger section and the second auger section, and flow of fluid between the first auger section and the second auger section is provided through the perforated wall portion and into and along the passage.

3. The food processing apparatus of claim 2, wherein the auger includes a shaft defining an axis and having a circumferential outer surface, the auger being positioned in the compartment such that the outer surface has an upper extent, the auger being rotatable about the axis, and wherein at least a portion of the perforated wall portion is positioned below the upper extent of the outer surface of the shaft.

4. The food processing apparatus of claim 3, wherein at least a majority of the perforated wall portion is positioned below the upper extent of the outer surface of the shaft.

5. The food processing apparatus of claim 4, wherein at least a portion of the perforated wall portion is positioned below the axis.

6. The food processing apparatus of claim 5, wherein the perforated wall portion is positioned below the axis.

7. The food processing apparatus of claim 3, wherein the fluid in the compartment has a fluid level, the fluid Level being below a height of the upper extent of the outer surface of the shaft.

8. The food processing apparatus of claim 7, wherein the fluid level is at about a height of the axis.

9. The food processing apparatus of claim 7, wherein the outer surface of the shaft has a lower extent, and wherein the fluid level is above a height of the lower extent of the outer surface of the shaft.

10. The food processing apparatus of claim 2, wherein the clearance inhibits the flow of fluid between the radial edge of the flights and the solid, imperforate wall portion from the inlet end to the outlet end, and wherein the passage extends from the inlet end to the outlet end.

11. The food processing apparatus of claim 2, wherein the perforated wall portion is separate from and connected to the solid, imperforate wall portion.

12. The food processing apparatus of claim 2, wherein the auger is rotatable about an axis, and wherein the food processing apparatus further comprises a manifold supported in the tank above the axis, fluid being suppliable through the manifold.

13. A food processing apparatus comprising:

a tank having an inlet end for receiving food product and an outlet end for discharging food product, the tank having an inner wall defining a compartment, a fluid being contained in the compartment, the inner wall having opposite sides generally parallel to a direction from the inlet end to the outlet end, wherein the inner wall has a curved portion with a radius of curvature generally centered on the axis, wherein the tank has a wall portion extending outwardly from one end of the curved portion to define a recessed portion, and wherein the manifold is positioned in the recessed portion and configured to inject fluid downwardly along an associated opposite side of the curved portion;

a rotatable auger mounted in the compartment for rotation about an axis, the auger for advancing food product within the compartment from the inlet end toward the outlet end, the auger including flights having a radial edge; and a manifold supported in the compartment above the axis of the auger, the manifold being positioned closer to one opposite side of the inner wall, the manifold being configured to inject fluid downwardly into the compartment.

14. The food processing apparatus of claim 1, wherein the clearance space is less than about 0.12 inches.

15. The food processing apparatus comprising:

a tank having an inlet end for receiving food product and an outlet end for discharging food product, the tank having an inner wall defining a compartment and including a solid, imperforate wall portion, fluid being contained in the compartment; and a rotatable auger mounted in the compartment, the auger for advancing food product within the compartment from the inlet end toward the outlet end, the auger including flights having a flight wall with a radial edge, the flight wall separating a first auger section from a second auger section, a clearance space being defined between the radial edge of the flights and the solid, imperforate wall portion of the inner wall;

wherein the clearance space inhibits the flow of fluid between the first auger section and the second auger section, wherein one of the inner wall and the flight wall includes a perforated wall portion, and wherein flow of fluid between the first auger section and the second auger section is provided through the perforated wall portion; and wherein the tank includes a support member connected between the second wall portion of the tank wall and the perforated wall portion of the inner wall, and further wherein the support member defines at least one fluid opening.

16. The food processing apparatus of claim 15, wherein the tank includes a plurality of support members, the support members being spaced along the axis.

17. A food processing apparatus comprising:

a tank having an inlet end for receiving food product and an outlet end for discharging food product, the tank having an inner wall defining a compartment and including a solid, imperforate wall portion, fluid being contained in the compartment; and a rotatable auger mounted in the compartment, the auger for advancing food product within the compartment from the inlet end toward the outlet end, the auger including flights having a flight wall with a radial edge, the flight wall separating a first auger section from a second auger section, a clearance space being defined between the radial edge of the flights and the solid, imperforate wall portion of the inner wall;

wherein the clearance space inhibits the flow of fluid between the first auger section and the second auger section, wherein one of the inner wall and the flight wall includes a perforated wall portion, and wherein flow of fluid between the first auger section and the second auger section is provided through the perforated wall portion;

wherein the inner wall of the tank includes the perforated wall portion, the tank having a tank wall providing the solid, imperforate wall portion and, relative to the solid, imperforate wall portion, an outwardly-extending second wall portion, a passage being defined between the perforated wall portion and the second wall portion, the passage extending in a direction of the inlet end and the outlet end, the passage extending at least between the first auger section and the second auger section, and flow of fluid between the first auger section and the second auger section is provided through the perforated wall portion and into and along the passage;

wherein the auger is rotatable about an axis, and wherein the food processing apparatus further comprises a manifold supported in the tank above the axis, fluid being suppliable through the manifold; and wherein the manifold is positioned in the passage.

18. The food processing apparatus comprising:

a tank having an inlet end for receiving food product and an outlet end for discharging food product, the tank having an inner wall defining a compartment and including a solid, imperforate wall portion, fluid being contained in the compartment; and a rotatable auger mounted in the compartment, the auger for advancing food product within the compartment from the inlet end toward the outlet end, the auger including flights having a flight wall with a radial edge, the flight wall separating a first auger section from a second auger section, a clearance space being defined between the radial edge of the flights and the solid, imperforate wall portion of the inner wall;

wherein the clearance space inhibits the flow of fluid between the first auger section and the second auger section, wherein one of the inner wall and the flight wall includes a perforated wall portion, and wherein flow of fluid between the first auger section and the second auger section is provided through the perforated wall portion;

wherein the inner wall of the tank includes the perforated wall portion, the tank having a tank wall providing the solid, imperforate wall portion and, relative to the solid, imperforate wall portion, an outwardly-extending second wall portion, a passage being defined between the perforated wall portion and the second wall portion, the passage extending in a direction of the inlet end and the outlet end, the passage extending at least between the first auger section and the second auger section, and flow of fluid between the first auger section and the second auger section is provided through the perforated wall portion and into and along the passage;

wherein the auger is rotatable about an axis, and wherein the food processing apparatus further comprises a manifold supported in the tank above the axis, fluid being suppliable through the manifold; and wherein the tank wall provides an outwardly-extending third wall portion circumferentially spaced from the second wall portion, the third wall portion defining an axially-extending recess, the manifold being positioned in the recess radially-outwardly of the radial edge of the flights.

19. The food processing apparatus of claim 18, wherein the recess is circumferentially spaced from the manifold by at least about 90 degrees.

20. The food processing apparatus of claim 19, wherein the recess is circumferentially spaced from the manifold by about 180 degrees.

21. The food processing apparatus of claim 12, wherein the manifold is configured to inject fluid downwardly along the inner wall.

22. The food processing apparatus of claim 21, wherein the manifold is positioned in the compartment and configured to inject fluid downwardly along one opposite side of the inner wall.

23. The food processing apparatus of claim 21, wherein the inner wall has a perforated wall portion extending from the one end of the curved portion and at least partially covering the recessed portion, and wherein the manifold is configured to inject fluid through the perforated wall portion.

24. The food processing apparatus of claim 23, and further comprising a support member connected between the wall portion of the tank and the perforated wall portion, the manifold being supported by the support member.

25. The food processing apparatus of claim 21, wherein the auger has an upper extent at a height, and wherein the manifold is positioned in the compartment below the height of the upper extent of the auger and beyond the radial edge of the flights of the auger.

26. A food processing apparatus comprising:

a tank having an inlet end for receiving food product and an outlet end for discharging food product, the tank having an inner wall defining a compartment, a fluid being contained in the compartment, the inner wall including a solid, imperforate wall portion and a perforated wall portion, the tank having a tank wall providing the solid, imperforate wall portion and a second wall portion, a passage being defined between the perforated wall portion and the second wall portion, the passage extending in a direction of and at least a portion of a distance between the inlet end and the outlet end;

a rotatable auger mounted in the compartment, the auger for advancing food product within the compartment from the inlet end toward the outlet end, the auger including flights having a radial edge, a clearance space being defined between the radial edge of the flights and the inner wall; and a manifold supported in the compartment above the axis of the auger, the manifold being positioned closer to one opposite side of the inner wall, the manifold being configured to inject fluid downwardly along one opposite side of the inner wall;

wherein the clearance space inhibits the flow of fluid between the radial edge of the flights and the solid, imperforate wall portion along at least a portion of the distance between the inlet end and the outlet end, and wherein flow is fluid is provided through the passage along at least a portion of the distance between the inlet end and the outlet end; and wherein the tank wall provides an outwardly-extending third wall portion circumferentially spaced from the second wall portion, the third wall portion defining an axially-extending recess, the manifold being positioned in the recess radially-outwardly of the radial edge of the flights.

27. A food processing apparatus comprising:

a tank having an inlet end for receiving food product and an outlet end for discharging food product, the tank having an inner wall defining a compartment, a fluid being contained in the compartment, the inner wall including a solid, imperforate wall portion and a perforated wall portion, the tank having a tank wall providing the solid, imperforate wall portion and a second wall portion, a passage being defined between the perforated wall portion and the second wall portion, the passage extending in a direction of and at least a portion of a distance between the inlet end and the outlet end;

a rotatable auger mounted in the compartment, the auger for advancing food product within the compartment from the inlet end toward the outlet end, the auger including flights having a radial edge, a clearance space being defined between the radial edge of the flights and the inner wall; and a manifold supported in the compartment above the axis of the auger, the manifold being positioned closer to one opposite side of the inner wall, the manifold being configured to inject fluid downwardly along one opposite side of the inner wall;

wherein the clearance space inhibits the flow of fluid between the radial edge of the flights and the solid, imperforate wall portion along at least a portion of the distance between the inlet end and the outlet end, and wherein flow is fluid is provided through the passage along at least a portion of the distance between the inlet end and the outlet end;

wherein the manifold is supported in the passage and is configured to inject fluid through the perforated wall portion.

\* \* \* \* \*